US012442799B1

(12) United States Patent
Agah et al.

(10) Patent No.: US 12,442,799 B1
(45) Date of Patent: Oct. 14, 2025

(54) PERSONALIZED INTEGRATED MOBILE EXHALATION DECODER

(71) Applicant: Virginia Tech Intellectual Properties, Inc., Blacksburg, VA (US)

(72) Inventors: Masoud Agah, Blacksburg, VA (US); Nipun Thamatam, Blacksburg, VA (US); Mustahsin Chowdhury, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 432 days.

(21) Appl. No.: 17/740,134

(22) Filed: May 9, 2022

Related U.S. Application Data

(60) Provisional application No. 63/185,427, filed on May 7, 2021.

(51) Int. Cl.
*G01N 33/497* (2006.01)
*G01N 30/14* (2006.01)
(Continued)

(52) U.S. Cl.
CPC ............. *G01N 30/14* (2013.01); *G01N 30/30* (2013.01); *G01N 30/32* (2013.01); *G01N 33/497* (2013.01);
(Continued)

(58) Field of Classification Search
CPC .................................................... G01N 33/497
See application file for complete search history.

(56) References Cited

U.S. PATENT DOCUMENTS 6,914,220 B2   7/2005  Tian et al.
9,823,211 B1 * 11/2017  Allen ................. G01N 33/0031
(Continued)

FOREIGN PATENT DOCUMENTS

WO   WO-9947905 A2 *   9/1999  ........... G01N 27/122
WO   WO-2004090534 A1 * 10/2004  ............... A61B 5/08
WO   WO-2007044473 A2 *  4/2007  ............. B01J 20/226

OTHER PUBLICATIONS

Agnieszka Stolarczyk et al., Micropreconcentrators: Recent Progress in Designs and Applications, Sensors, 2022, 1-14, 22, 1327, MDPI, Basel, Switzerland.

*Primary Examiner* — John E Breene
*Assistant Examiner* — Alex T Devito
(74) *Attorney, Agent, or Firm* — Perilla Knox & Hildebrandt LLP; Jonathan A. Paulis

(57) ABSTRACT

A breath analyzer apparatus includes a breath sampler and a breath analyzer. The breath sampler can include a microelectromechanical (MEMS) preconcentrator to trap and collect volatile organic compounds (VOCs) in a subject's breath. The MEMS preconcentrator can have top facing inlets and outlets. The MEMS preconcentrator can be housed in a preconcentrator cartridge that can be removably positioned in the breath sampler. After the breath sampler is utilized to trap the VOCs in the MEMS preconcentrator, the preconcentrator cartridge can be removed from the breath sampler and inserted into or mounted on the breath analyzer to analyze the trapped VOCs for indication for diseases. A functionalization apparatus utilizes the top facing inlets and outlets of the MEMS preconcentrator to carry out wafer level simultaneous functionalization of multiple MEMS preconcentrators.

14 Claims, 22 Drawing Sheets

(51) Int. Cl.
  *G01N 30/30* (2006.01)
  *G01N 30/32* (2006.01)
  *G01N 30/02* (2006.01)

(52) U.S. Cl.
  CPC ... *G01N 2030/025* (2013.01); *G01N 33/4975* (2024.05)

(56) References Cited

U.S. PATENT DOCUMENTS

| | | |
|---|---|---|
| 10,852,278 B2 | 12/2020 | Agah et al. |
| 2011/0094290 A1 | 4/2011 | Knobloch et al. |
| 2019/0072529 A1* | 3/2019 | Andrawes .......... G01N 30/8651 |
| 2020/0049673 A1 | 2/2020 | Lim et al. |
| 2021/0096111 A1 | 4/2021 | Gianchandani et al. |
| 2021/0316246 A1 | 10/2021 | Davis et al. |

* cited by examiner

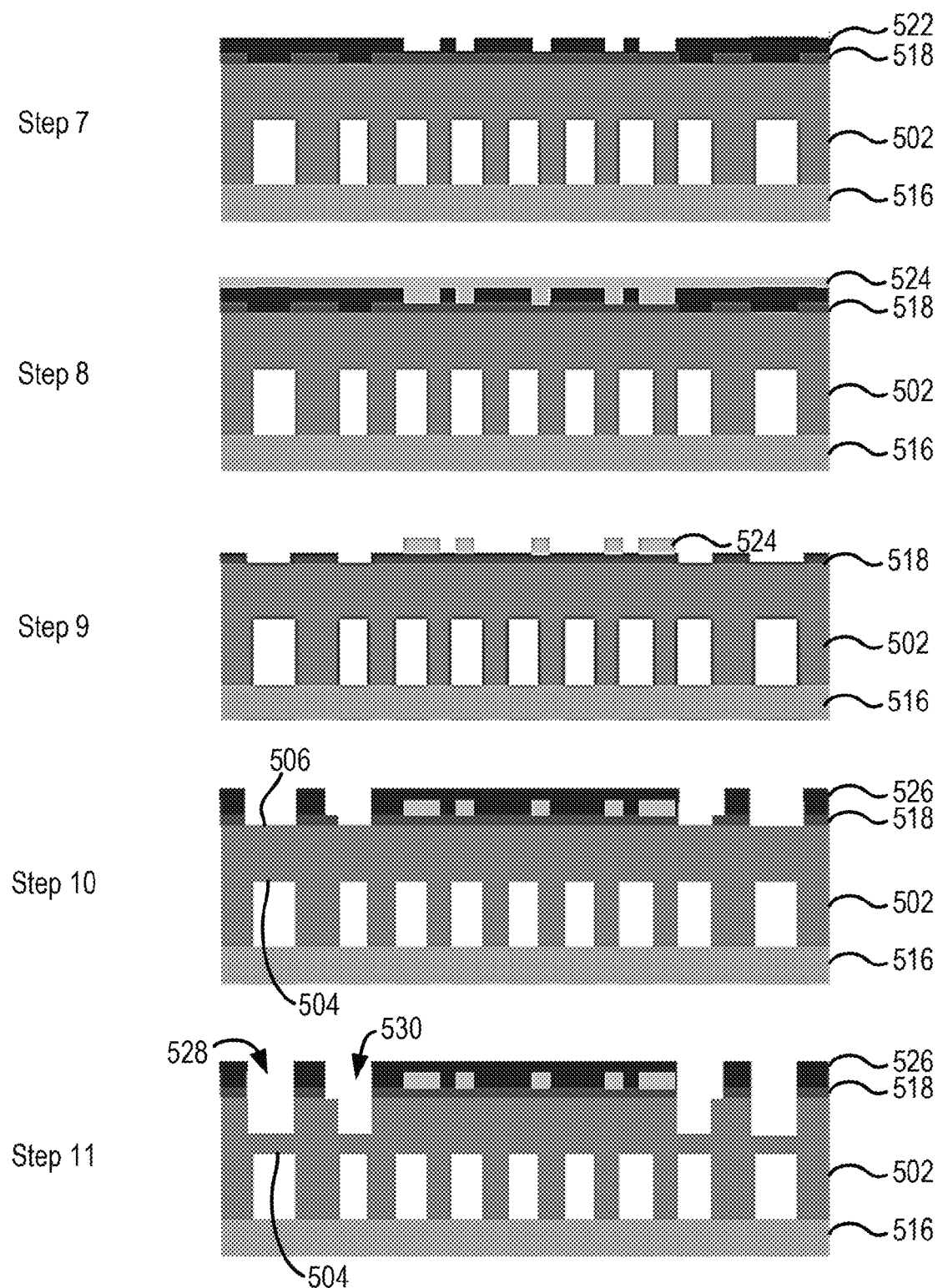
Figure 5 (contd.)

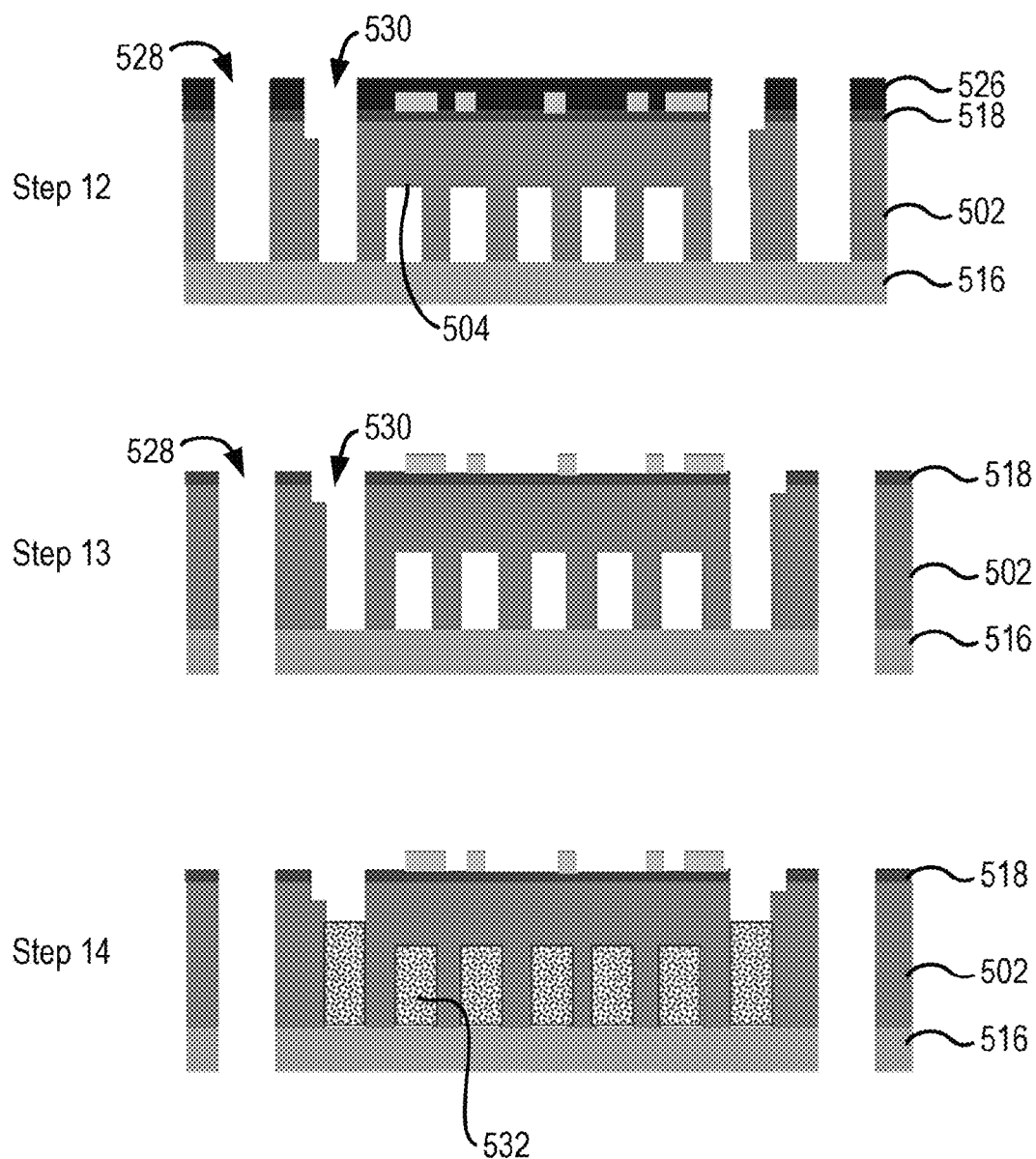
Figure 5 (contd.)

PERSONALIZED INTEGRATED MOBILE EXHALATION DECODER

CROSS-REFERENCE TO RELATED APPLICATIONS

This application claims priority to U.S. Provisional Patent Application No. 63/185,427, entitled "Personalized Integrated Mobile Exhalation Decoder," filed May 7, 2021, the entirety of which is incorporated by reference herein.

STATEMENT REGARDING FEDERALLY SPONSORED RESEARCH OR DEVELOPMENT

This invention was made with government support under grant number 1711699, awarded by the National Science Foundation, and under grant number R01 OH011350, awarded by the Centers for Disease Control and Prevention. The government has certain rights in the invention.

TECHNICAL FIELD

This disclosure relates to breath analyzers, and in particular to portable and mobile breath analyzers.

DESCRIPTION OF RELATED TECHNOLOGY

Gas chromatography involves the collection and analysis of gases for detecting presence of components. Micro gas chromatography utilizes chip based micro columns for separation and detection of the components of the gas. In some examples, micro-preconcentrators can be utilized where the concentration of the components to be detected is too low for the detectors to detect. In such instances, the components are trapped in the preconcentrator, which can include adsorbing agents, before being processes through the micro columns for detection.

SUMMARY

In some aspects, the techniques described herein relate to a portable apparatus for analyzing volatile organic compounds (VOCs) in breath of a subject, including: a microelectromechanical (MEMS) preconcentrator, including: a top surface and a bottom surface, the top surface defining at least one inlet and at least one outlet, a plurality of channels in fluid communication with the at least one inlet and the at least one outlet, the plurality of channels lined with a stationary phase, at least one heating element, and at least one temperature sensor; a preconcentrator cartridge, including: a cartridge inlet and a cartridge outlet, the cartridge inlet in fluid communication with the at least one inlet and the cartridge outlet in fluid communication with the at least one outlet, a heat sink positioned proximate the bottom surface of the MEMS preconcentrator, a first set of interconnects that are electrically coupled with the at least one heating element and the at least one temperature sensor; a receptacle for removably housing the preconcentrator cartridge; an inlet conduit in fluid communication with the cartridge inlet when the preconcentrator cartridge is in an inserted position within the receptacle; an outlet conduit in fluid communication with the cartridge outlet when the preconcentrator cartridge is in an inserted position within the receptacle; a second set of interconnects making electrical contact with the first set of interconnects when the preconcentrator cartridge is in an inserted position within the receptacle; and a mouthpiece selectively in fluid communication with the cartridge inlet.

In some aspects, the techniques described herein relate to a portable apparatus, the MEMS preconcentrator further including: a substrate having a front surface and a back surface, wherein the back surface of the substrate corresponds to the top surface of the MEMS preconcentrator, a plurality of pillars that extend outwardly from the front surface of the substrate, the plurality of pillars defining the plurality of channels, and a sealing structure positioned over the plurality of pillars, the sealing structure having a pillar side surface and an outer surface, the outer surface corresponding to the bottom surface of the MEMS preconcentrator, wherein the at least one inlet and the at least one outlet extend at least between the front surface and the back surface of the substrate.

In some aspects, the techniques described herein relate to a portable apparatus, wherein the at least one heating element and the at least one temperature sensor are disposed over the back surface of the substrate. In some aspects, the techniques described herein relate to a portable apparatus, wherein the first set of interconnects form a solderless contact with terminals of the at least one heating element and the at least one temperature sensor. In some aspects, the techniques described herein relate to a portable apparatus, wherein the longitudinal axes of the at least one inlet and the at least one outlet are substantially normal to the front surface of the substrate. In some aspects, the techniques described herein relate to a portable apparatus, wherein the plurality of pillars are coated with an adsorbent.

In some aspects, the techniques described herein relate to a portable apparatus, further including: compressible washers positioned between the cartridge inlet and the at least one inlet and positioned between the cartridge outlet an the at least one outlet, the washers providing a leak-proof seal between the cartridge inlet and the at least one inlet and between the cartridge outlet and the at least one outlet. In some aspects, the techniques described herein relate to a portable apparatus, further including: a four-way valve, including a first channel in fluid communication with the cartridge inlet, a second channel in fluid communication with a vent, a third channel in fluid communication with a sample collector syringe, and a fourth channel in fluid communication with the mouthpiece, the four-way valve configured to, during a first duration, couple the mouthpiece with the sample collector syringe, and during a second duration, decouple the mouthpiece from the sample collector syringe, and couple the sample collector syringe with the cartridge inlet. In some aspects, the techniques described herein relate to a portable apparatus, further including: a flow meter positioned downstream of the mouthpiece and upstream of the four-way valve, the flow meter configured to provide an indicator of a flow detection over a threshold value. In some aspects, the techniques described herein relate to a portable apparatus, further including: a high frequency carbon-dioxide sensor downstream of the mouthpiece and upstream of the four-way valve, wherein the first duration corresponds to the carbon-dioxide sensor measuring a value above a threshold value.

In some aspects, the techniques described herein relate to a portable apparatus, further including: an analysis module, including: a first micro-separation column coated with a first column stationary phase, the first micro-separation column including a first column inlet and a first column outlet, a plurality of parallel second micro-separation columns, each including a second column inlet in fluid communication with the first column outlet and a second column outlet, wherein the first micro-separation column and the plurality of parallel second micro-separation columns are configured to receive an analyte desorbed from the MEMS preconcentrator.

In some aspects, the techniques described herein relate to a portable apparatus, the analysis module further including: an analysis module receptacle configured to removably accept the preconcentrator cartridge, a first column conduit for fluidly coupling the first column inlet to the cartridge outlet when the preconcentrator cartridge is mated with the analysis module receptacle, a third set of interconnects making electrical contact with the first set of interconnects when the preconcentrator cartridge is mated with the analysis module receptacle.

In some aspects, the techniques described herein relate to a portable apparatus, the analysis module further including: a controller configured to: initiate the heating element on the preconcentrator cartridge via the third set of interconnects, initiate flow of a carrier gas through the preconcentrator cartridge, cause the carrier gas and the analyte at the cartridge outlet into the first micro-separation column and the plurality of parallel second micro-separation columns, receive data from a first column detector at the first column outlet, and receive date from each of a plurality of parallel second column detectors corresponding to the plurality of parallel second micro-separation columns.

In some aspects, the techniques described herein relate to a portable apparatus, a processor communicably coupled with the first column detector and the plurality of parallel second column detectors, the processor configured to: process retention times included in the data from the first column detector and data from the plurality of parallel second column detectors to identify one or more VOC biomarkers. In some aspects, the techniques described herein relate to a portable apparatus, wherein the processor is configured to: process retention times using a machine learning model trained to provide an identity of a VOC based on a set of retention times. In some aspects, the techniques described herein relate to a portable apparatus, wherein the analysis module is physically coupled with a sampler module including at least the MEMS preconcentrator.

In some aspects, the techniques described herein relate to a preconcentrator functionalization apparatus, including: a wafer holder base configured to receive a wafer including a plurality of microelectromechanical (MEMS) preconcentrator chips, each of which includes at least one top facing inlet and at least one top facing outlet, the wafer holder base including at least one base alignment structure, a fluid distribution module including: a purge gas inlet, a stationary phase inlet, a plurality of inlet ports configured to couple with the at least one top facing inlet of the plurality of MEMS preconcentrator chips, a fluid multiplexer configured to selectively couple the plurality of inlet ports with one of the purge gas inlet and the stationary phase inlet, a plurality of outlet ports configured to couple with the at least one top facing outlet of the plurality of MEMS preconcentrator chips, at least one fluid distribution module alignment structure which when aligned with the at least one base alignment structure aligns the plurality of inlet ports with the at least top facing inlet of the plurality of MEMS preconcentrator chips and aligns the plurality of outlet ports with the at least one top facing outlet of the plurality of MEMS preconcentrator chips, and at least one fluid outlet coupled with the plurality of outlet ports.

In some aspects, the techniques described herein relate to a preconcentrator functionalization apparatus, wherein the fluid distribution module further includes: a plurality of washers positioned at interfaces between the plurality of inlet ports and the at least one top facing inlet of the plurality of MEMS preconcentrator chips and at interfaces between the plurality of outlet ports and the at least one top facing outlet of the plurality of MEMS preconcentrator chips.

In some aspects, the techniques described herein relate to a preconcentrator functionalization apparatus, the fluid distribution module further including: a base structure having a top surface and a bottom surface, wherein the plurality of inlet ports and the plurality of outlet ports extend from the bottom surface, a plurality of conduits that extend between at least the top surface and the bottom surface of the base, the plurality of conduits in fluid communication with the plurality of inlet ports and the plurality of outlet ports, a plurality of inlet tubes that fluidly couple the fluid multiplexer with the plurality of conduits in fluid communication with the plurality of inlet ports, and a plurality of outlet tubes that fluidly couple the at least one fluid outlet with the plurality of conduits in fluid communication with the plurality of outlet ports.

In some aspects, the techniques described herein relate to a preconcentrator functionalization apparatus, the fluid distribution module further including: a base structure having a plurality of internal conduits that couple the fluid multiplexer with the plurality of inlet ports and that couple the at least one fluid outlet with the plurality of outlet ports.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

Like reference numbers and designations in the various drawings indicate like elements.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Figure 1A:
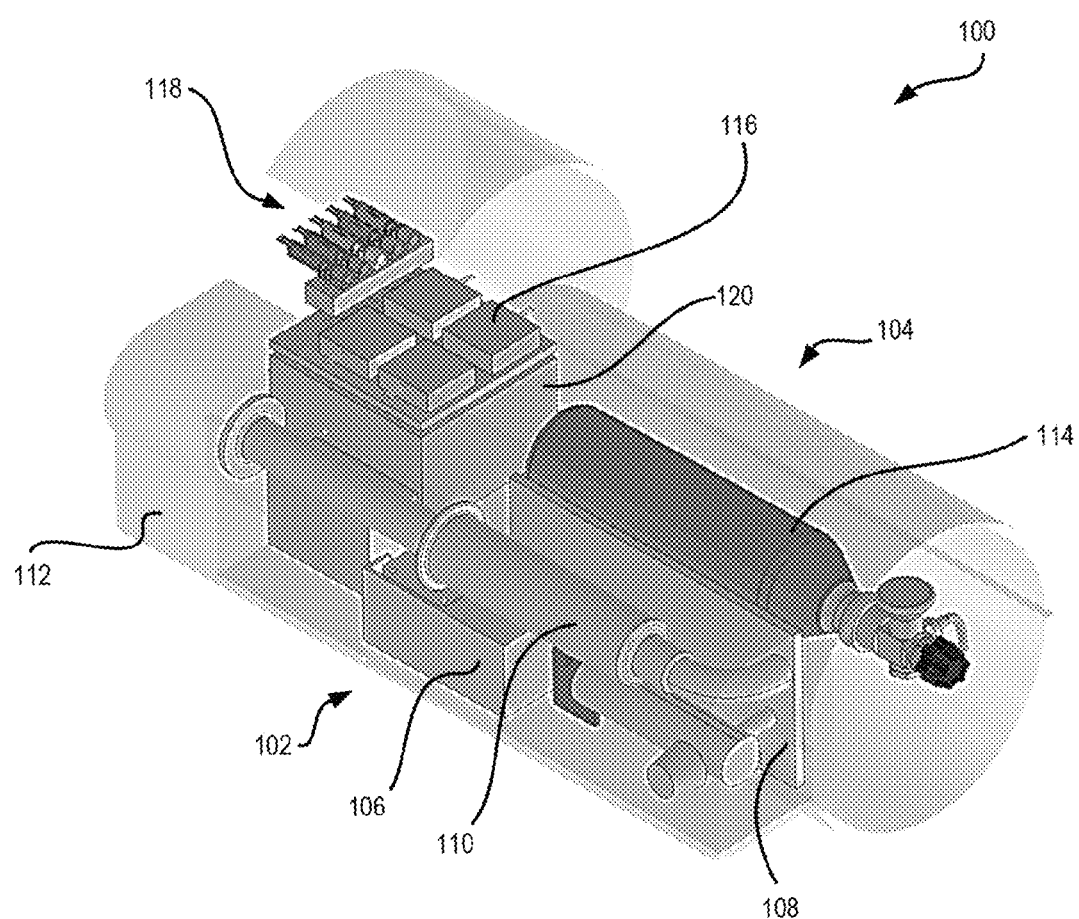
FIG. 1A shows an example personalized integrated mobile exhalation decoder.

FIG. 1A shows an example personalized integrated mobile exhalation decoder. In particular, FIG. 1A shows an example breath analyzer apparatus 100 that can be utilized for analyzing volatile organic compounds (VOCs) in breath of a subject. The breath analyzer apparatus 100 can include a breath sampler 102 and a breath analyzer 104. In the example shown in FIG. 1A, the breath sampler 102 and the breath analyzer 104 are attached to each other. However, this is only an example, and the breath sampler 102 and the breath analyzer 104 can be separate. In some examples, the breath sampler 102 and the breath analyzer 104 can be removably attached to each other. The breath sampler 102 can be configured to collect a breath sample from a subject into a preconcentrator. In configurations where the breath sampler 102 is fluidly attached to the breath analyzer 104 (discussed below), an analyte, corresponding to the subject's breath, stored in the preconcentrator can be communicated to the breath analyzer 104 by a fluid connector. In other examples, where the breath sampler 102 is not fluidly coupled with the breath analyzer 104 (also discussed below), the breath sampler 102 can include a removable cartridge housing the preconcentrator, which cartridge can be removed from the breath sampler 102 and attached to the breath analyzer 104 for the breath analyzer 104 to analyze the analyte.

The breath sampler 102 can include, without limitation, a preconcentrator cartridge (not shown in FIG. 1A, but discussed further in relation to FIGS. 6-8), a microelectromechanical (MEMS) preconcentrator (not shown in FIG. 1A, but discussed further in relation to FIGS. 4-5), receptacle 106 for removably housing the preconcentrator cartridge, a routing board 108, and a mouthpiece for interfacing with the subject. The breath sampler 102 also can include a collection syringe 110 for initial collection of the subject's breath before being passed into the preconcentrator. The routing board 108 can include multiple fluidic channels for routing the fluids between various components of the breath sampler 102. The routing board 108 also can include a printed circuit board for mounting electronic components as well as interconnects associated with the operation of the breath sampler 102. While not shown in FIG. 1A, the breath sampler 102 also can include a flow meter, a carbon-dioxide ($CO_2$) sensor, and a multi-way valve. Various components of the breath sampler 102 can be housed in a sampler housing 112, which can include openings at least for the mouthpiece and the receptacle 106.

The breath analyzer 104 can include a carrier gas container 114, a pump, a plurality of valves 118 (e.g., 2-way valves, 3-way valves, etc.), separation stages including one or more columns, detectors, thermal conductivity detectors (TCDs), heating elements, microcontrollers, memory, communication modules, etc. As examples, FIG. 1A shows the carrier gas container 114 that contains a carrier gas, which is combined with the breath sample collected from a breath sampler and passed through one or more separators such as, for example, microcolumns 116, to separate the various VOCs in the breath sample. The microcolumns 116 can include multi-dimension separation columns. The microcolumns 116 can be coupled to an analyzer processing module 120, which can include fluidic channels. A preconcentrator cartridge may also be coupled with the analyzer processing module 120 and can be positioned adjacent to the microcolumns 116. The plurality of valves 118 can provide selective fluid coupling between the preconcentrator cartridge, the carrier gas container 114, the microcolumns 116, the detectors and other components of the breath analyzer 104. The analyzer processing module 120 can also include electronic components such as, for example, interconnects, microcontrollers, memory, power source, wireless communication module, wired ports, (such as e.g., USB, ethernet port, or other communication ports), etc., for the operation of the breath analyzer 104. Various components of the breath analyzer 104 can be housed in an analyzer housing 124.

Figure 1B:
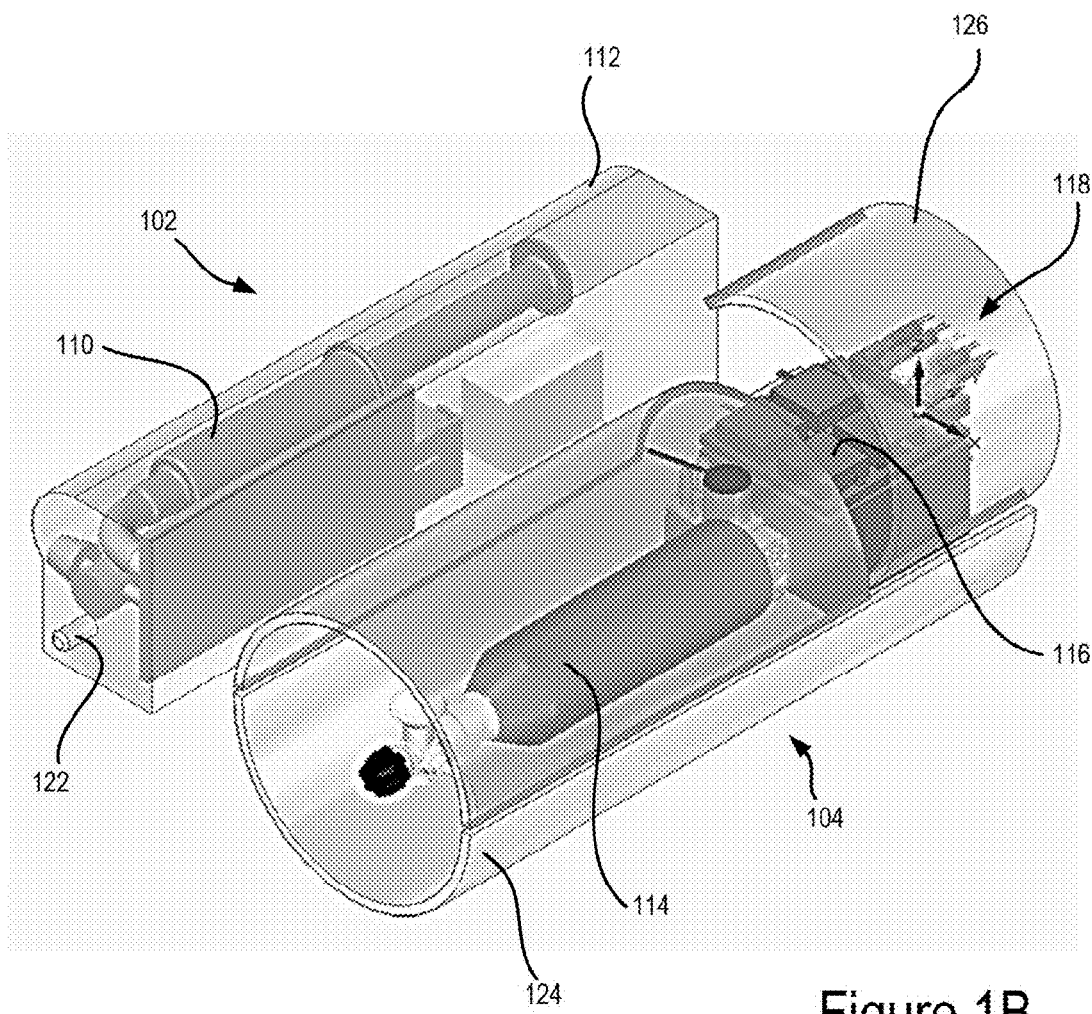
FIG. 1B shows another view of the breath analyzer apparatus.

FIG. 1B shows another view of the breath analyzer apparatus 100. In particular, FIG. 1B shows the breath sampler 102 and the breath analyzer 104 separated. FIG. 1B also clearly shows the mouthpiece 122 on the breath sampler 102. The analyzer housing 124 can include a retractable lid or other kind of opening for accessing one or more components such as, for example, the preconcentrator cartridge or the microcolumns 116.

Figure 2:
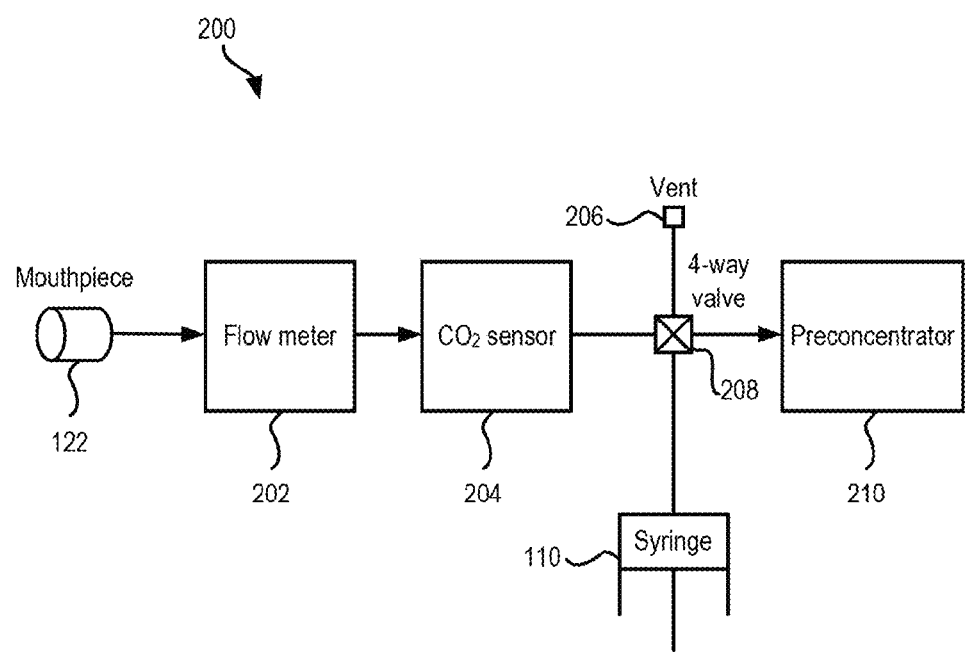
FIG. 2 depicts an example block diagram of the breath sampler shown in FIG. 1A.

FIG. 2 depicts an example block diagram 200 of the breath sampler 102 shown in FIG. 1A. The breath sampler 102 enables breath collection maneuvers such as single prolonged exhalation, tidal breathing, and reservoir collection. The breath sampler 102 includes the mouthpiece 122 into which a subject can exhale, a flow meter 202 positioned downstream of the mouthpiece 122 for sensing the flow rate of the exhalation, a $CO_2$ sensor 204 for measuring the $CO_2$ concentration of the exhalation, a 4-way valve 208 that is coupled with a fluid channel carrying the subject's breath from the mouthpiece 122, the collection syringe 110, a vent 206, and a preconcentrator 210 (e.g., positioned within a preconcentrator cartridge). During operation, the 4-way valve 208 can be configured to direct exhaled breath from the mouthpiece 122 into the collection syringe 110. Thereafter, the 4-way valve 208 can be configured to direct the collected breath from the collection syringe 110 into the preconcentrator 210 for adsorption. The flow meter 202 and the sensor 204 can ensure that alveolar air from the subject is collected and a controller can ensure that the flow rate and the $CO_2$ concentration are above their respective threshold values before opening the 4-way valve 208 to direct the exhaled breath into the collection syringe 110. In some examples, the flow meter 202 can provide feedback (e.g., visual, aural, tactile, etc.) to the subject when the flow rate is at or greater than a desired flow rate to allow the subject to adjust their exhalation accordingly. In some examples, the breath sampler 102 may not include the flow meter 202 and the sensor 204. The 4-way valve 208 can also be configured to direct the subject's breath into the vent 206 if the desired volume of breath has been collected in the collection syringe 110 or if the collection syringe 110 has reached its capacity. In some examples, the 4-way valve 208 can be manually controlled to direct the subject's breath from the mouthpiece 122 into the collection syringe 110 and from the collection syringe 110 into the preconcentrator 210. In some examples, the breath sampler 102 may also not include the collection syringe 110, and the exhaled breath can be directly passed through the preconcentrator 210 for VOC adsorption.

Figure 3A:
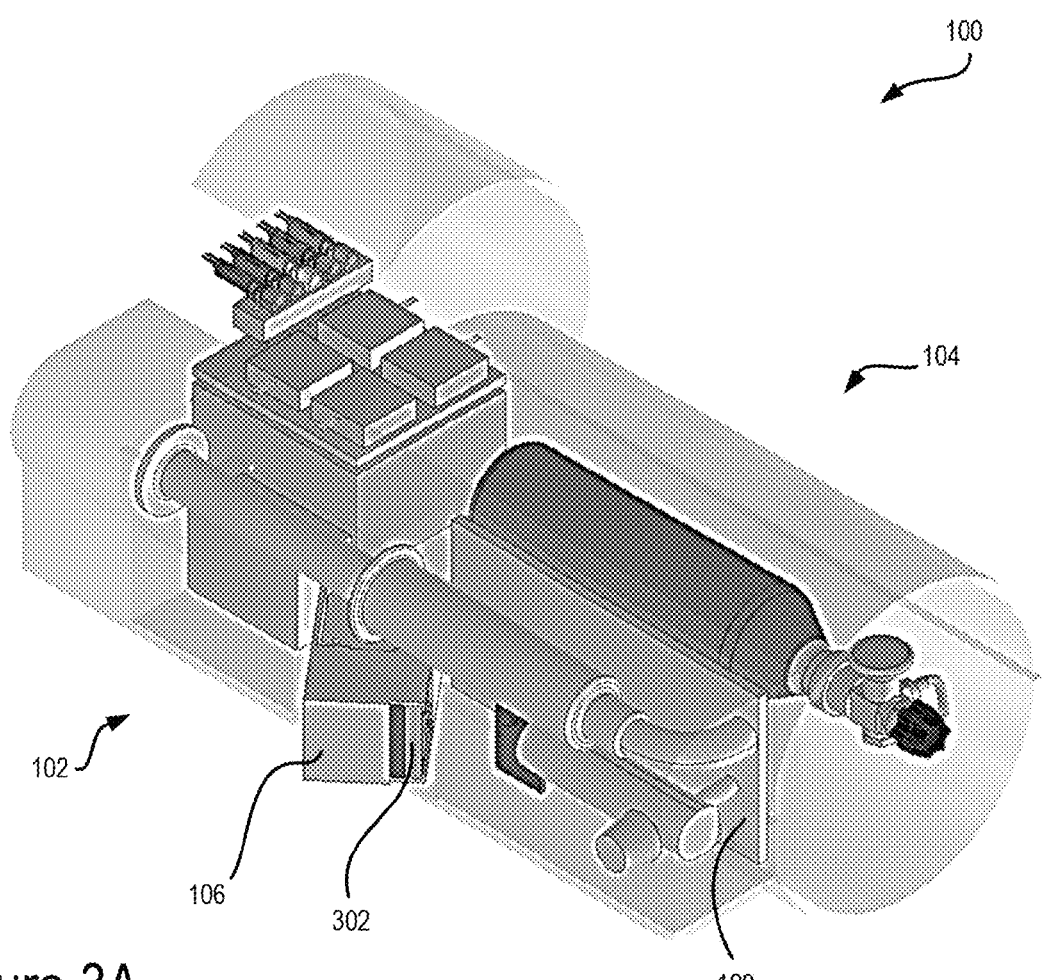
FIG. 3A illustrates the breath sampler with the receptacle 106 in an open position.

FIG. 3A illustrates the breath sampler 102 with the receptacle 106 in an open position. In the open position, the receptacle 106 facilitates the removal (or insertion) of a preconcentrator cartridge 302 from the receptacle 106. In the example shown in FIG. 3A, the receptacle 106 turns around an axis to provide access to the preconcentrator cartridge 302. In some other examples, the receptacle 106 can include a lid, which when lifted, can allow access to the preconcentrator cartridge 302. In the open position, the receptacle 106 can disconnect the preconcentrator cartridge 302 from conduits and electrical interconnects positioned on the routing board 108. For example, the routing board 108 can include an inlet conduit and an outlet conduit, which, when the receptacle 106 is in a closed position, are in fluid communication with a cartridge inlet and a cartridge outlet, respectively, of the preconcentrator cartridge 302. In addition, the preconcentrator cartridge 302 can include a first set of interconnects that make electrical contact with at least one heating element and at least one temperature sensor on the preconcentrator. The routing board 108, or a separate circuit board on the breath sampler 102, can include a second set of interconnects that make electrical contact with the first set of interconnects when the receptacle 106 is in a closed position with the preconcentrator cartridge 302 inserted in the receptacle 106.

Figure 3B:
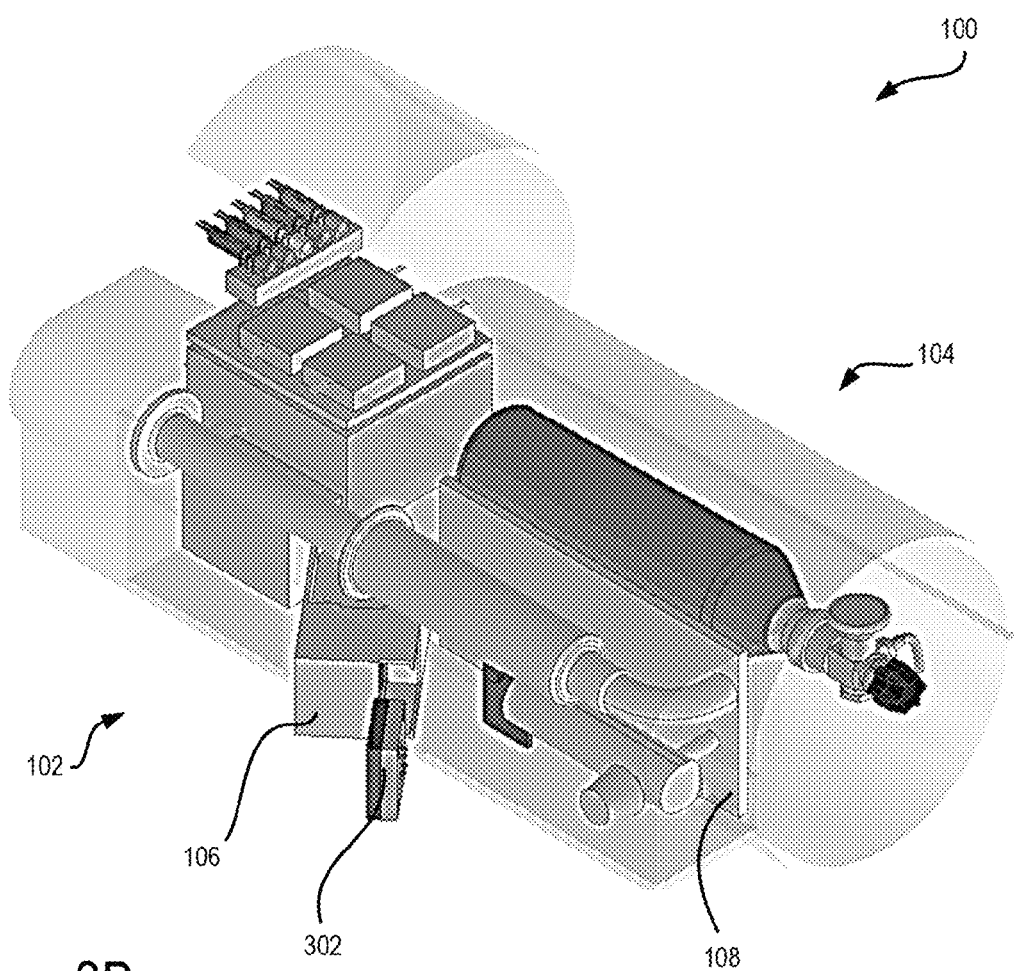
FIG. 3B illustrates the breath sampler with the preconcentrator cartridge removed from the receptacle when the receptacle is in an open position.

FIG. 3B illustrates the breath sampler 102 with the preconcentrator cartridge 302 removed from the receptacle 106 when the receptacle 106 is in an open position. In some examples, the preconcentrator cartridge 302 can be held in place in the receptacle 106 by friction. In some examples, the preconcentrator cartridge 302 can be held in place in the receptacle 106 by a fastener such as, for example, a screw, a clamp, an adhesive, etc. based on the type of fastener used to position the preconcentrator cartridge 302 in the receptacle 106, the preconcentrator cartridge 302 can be removed from the receptacle 106 for analysis of the VOCs adsorbed to the preconcentrator.

Figure 3C:
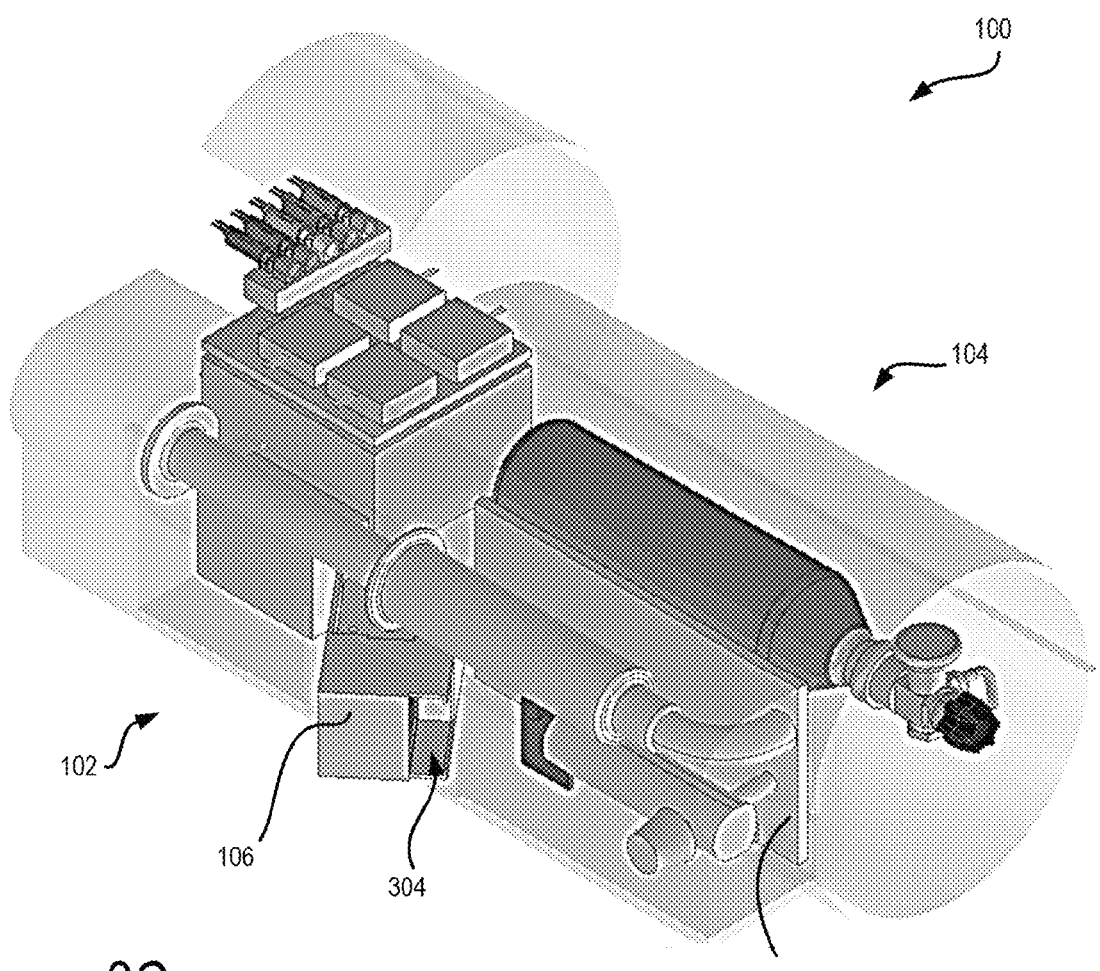
FIG. 3C illustrates the breath sampler with the preconcentrator cartridge removed from the receptacle.

FIG. 3C illustrates the breath sampler 102 with the preconcentrator cartridge 302 removed from the receptacle 106. The receptacle 106 shown in FIG. 3C can include slots or brackets 304 to aid in the positioning and the insertion of the preconcentrator cartridge 302 into the receptacle 106.

Figure 3D:
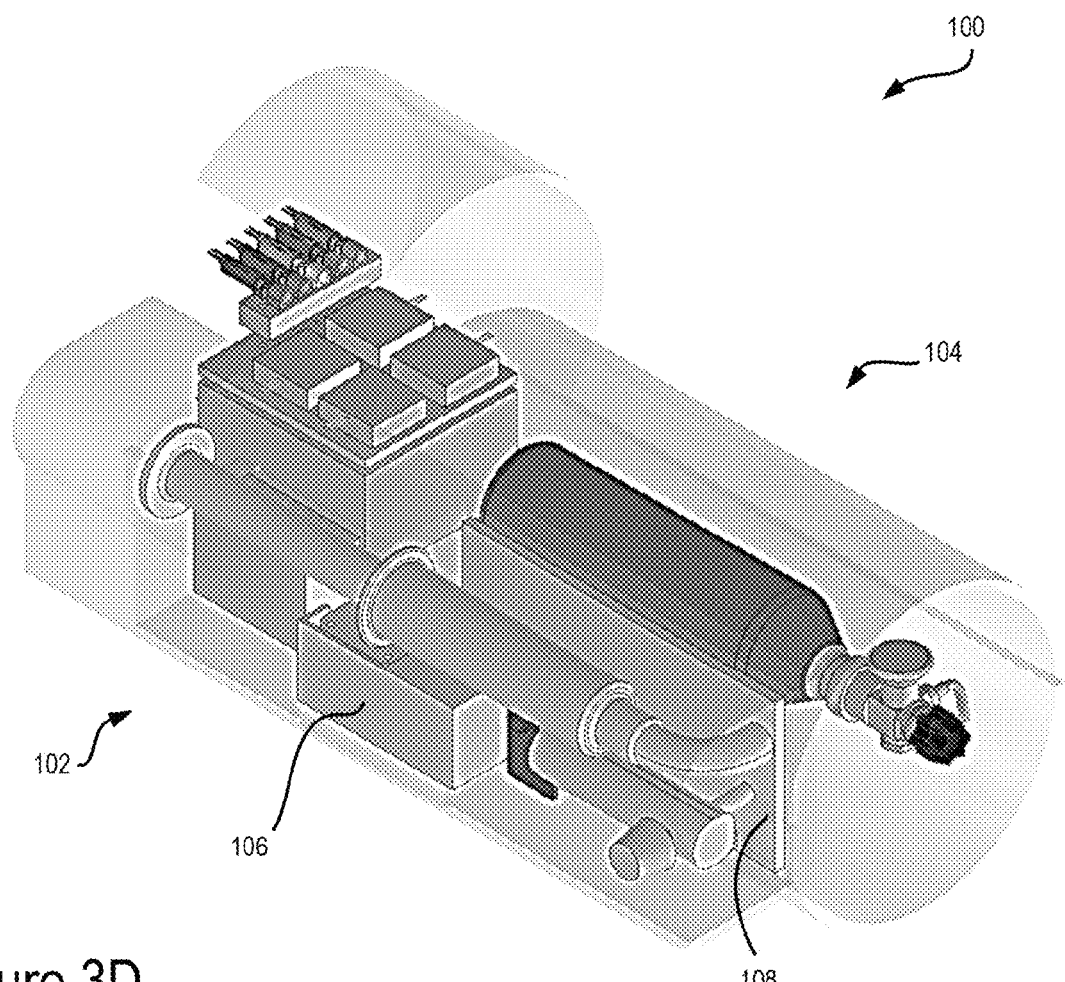
FIG. 3D illustrates the breath sampler with the receptacle in a closed position.

FIG. 3D illustrates the breath sampler 102 with the receptacle 106 in a closed position. In instances where the receptacle 106 houses a preconcentrator cartridge 302, in the closed position, the fluid inlet and outlets on the preconcentrator cartridge 302 are positioned against corresponding inlets and outlets on the routing board 108. Similarly, interconnects on the preconcentrator cartridge 302 are in contact with corresponding interconnects on the routing board 108 or a circuit board.

Figure 3E:
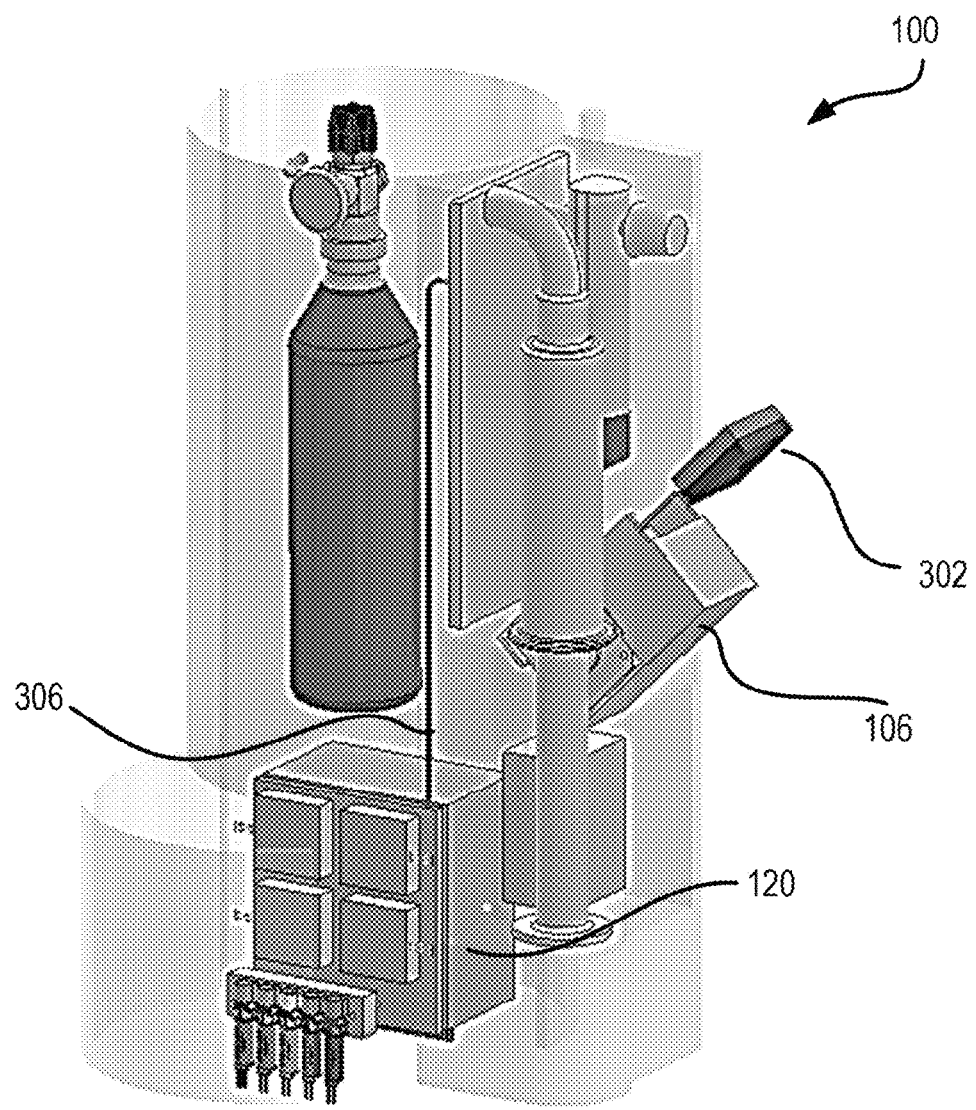
FIG. 3E illustrates the breath analyzer apparatus that includes a conduit between the breath sampler and the breath analyzer.

FIG. 3E illustrates the breath analyzer apparatus 100 that includes a conduit 306 between the breath sampler 102 and the breath analyzer 104. In particular, the breath analyzer apparatus 100 includes the conduit 306 can carry the analyte from the preconcentrator cartridge 302 to the analyzer processing module 120. This example can alleviate the need to remove the preconcentrator cartridge 302 from the breath sampler 102 and couple with the breath analyzer 104.

In some examples, a length of the breath analyzer apparatus 100 can be about 15 mm to about 45 mm, or about 35 mm. In some examples, the width of the breath analyzer apparatus 100 can be about 5 mm to about 25 mm, or about 15 mm. In some examples, the diameter of the breath analyzer 104 can be about 5 mm to about 15 mm.

Figure 4A:
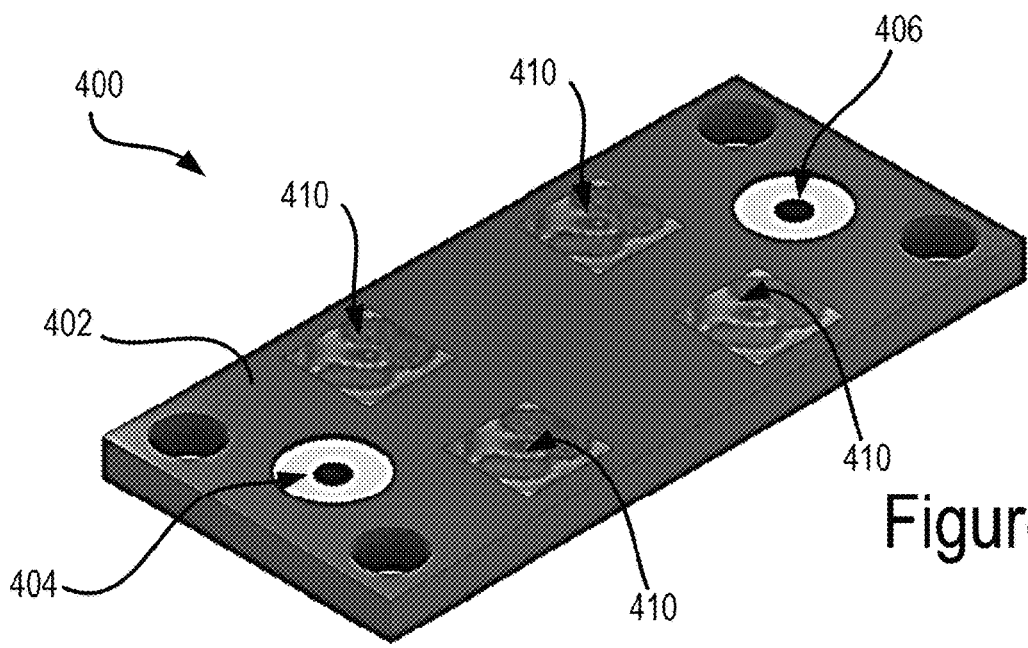
FIG. 4A shows an example representation of a microelectromechanical systems (MEMS) preconcentrator.
Figure 4B:
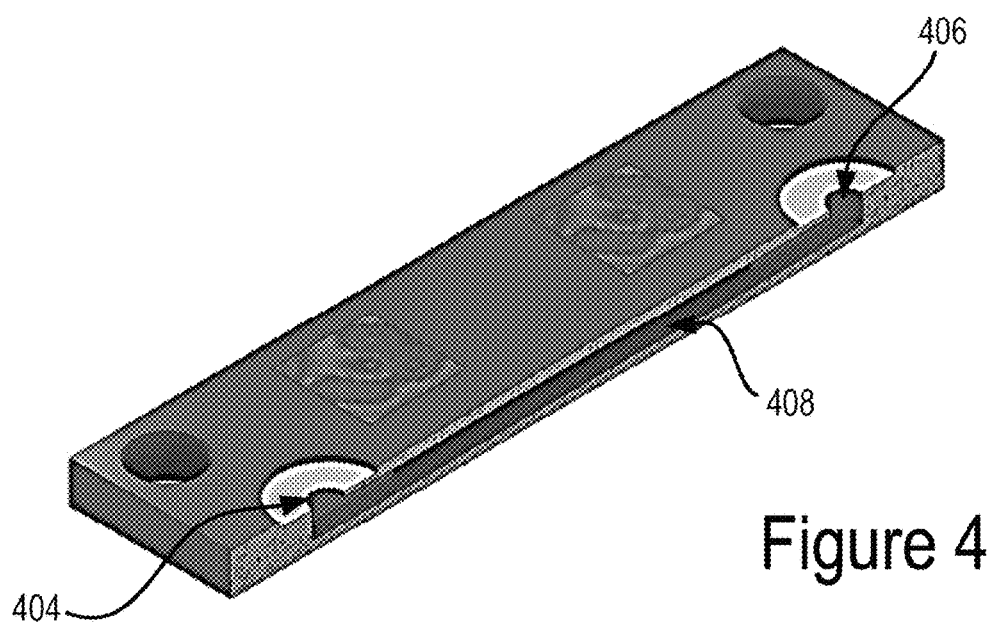
FIG. 4B, shows a cross-sectional three-dimensional view of the MEMS preconcentrator shown in FIG. 4A.
Figure 4C:
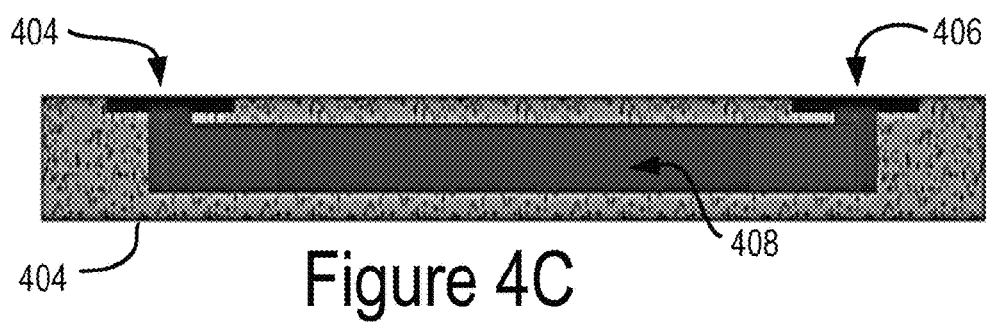
FIG. 4C shows a cross-sectional side view of the MEMS preconcentrator shown in FIG. 4A.

FIG. 4A shows an example representation of a microelectromechanical systems (MEMS) preconcentrator 400. FIG. 4B, shows a cross-sectional three-dimensional view of the MEMS preconcentrator 400 shown in FIG. 4A, and FIG. 4C shows a cross-sectional side view of the MEMS preconcentrator 400 shown in FIG. 4A. The MEMS preconcentrator 400 can be utilized as a trap for capturing VOCs exhaled by the subject as well as reducing humidity and the water content from the subject's breath. Generally, the concentration of VOCs in the breath of a subject can be very low (in the parts-per-billion range). As a result, the VOCs may not be detectable just by passing the breath sample though a microcolumn separator of a micro gas chromatograph. A preconcentrator can improve the quality of separations by focusing the analytes to a small bandwidth before injection into a micro-column, which can help in acquiring sharper, narrower peaks with improved signal-to-noise ratio.

The MEMS preconcentrator 400 can include a top surface 402 and a bottom surface (shown in FIG. 4C), where the top surface 402 defines at least one inlet 404 and at least one outlet 406. The MEMS preconcentrator 400 also includes a plurality of channels 408 (shown in FIGS. 4B and 4C) in fluid communication with the at least one inlet 404 and the at least one outlet 406. An area around the at least one inlet 404 and the at least one outlet 406 can include structures such as, for example, an indented region that can allow a corresponding conduit to be positioned securely around the openings of the inlet and the outlet. The MEMS preconcentrator 400 can include a plurality of interconnects 410 that can form terminals of one or more electrical devices such as, for example, at least one heating element and at least one temperature sensor. The interconnects 410 can make contact with solderless interconnects of the preconcentrator cartridge 302 (discussed further below).

Figure 5:
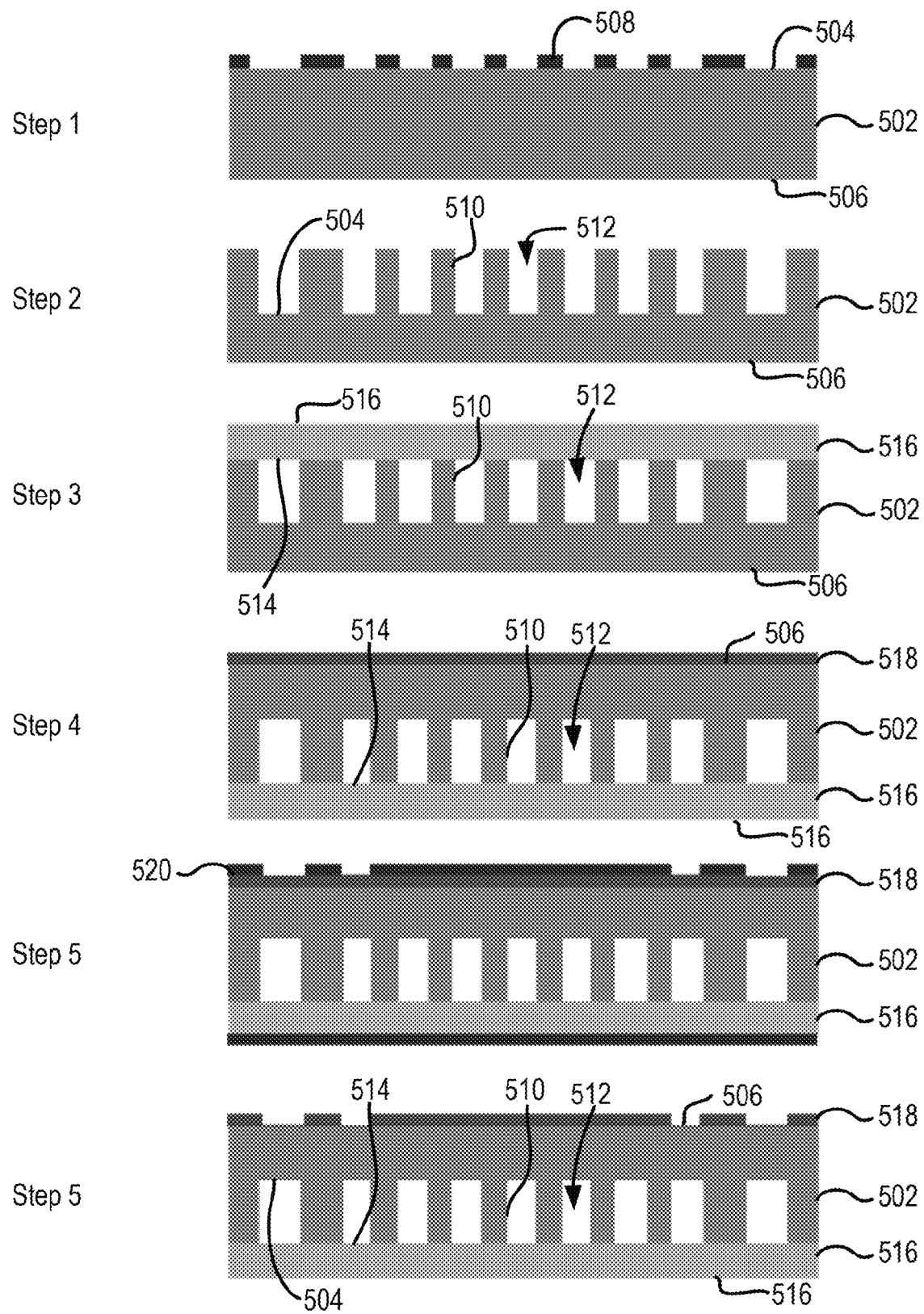
FIG. 5 shows an example fabrication process for forming a preconcentrator such as the MEMS preconcentrator 400 shown in FIGS. 4A-4C.

FIG. 5 shows an example fabrication process 500 for forming a preconcentrator such as the MEMS preconcentrator 400 shown in FIGS. 4A-4C. The fabrication process 500 can be employed to design high capacity preconcentrators with high-aspect ratio channels, large surface area, low pressure drop, low thermal mass, and robust structure. While the fabrication process 500 depicted in FIG. 5 includes a number of steps, it should be understood that a set of steps shown can be combined in a smaller or a larger set of steps based on the fabrication process used. Further, the sequence of some of the steps could be altered to achieve the final outcome. At step 1, a substrate 502 is provided. The substrate 502 can be a semiconductor substrate such as, for example, a silicon wafer. The substrate 502 can include a front surface 504 and a back surface 506. A patterned photoresist 508 can be deposited over the front surface 504 of the substrate 502. At step 2, the substrate 502 can undergo an etching process to etch out the portions of the substrate 502 that are exposed and not covered by the patterned photoresist 508. The substrate 502 can be etched using an anisotropic etching process such as, for example, deep reactive-ion etching (DRIE), to create high aspect-ratio trenches. Step 2 shows the result of the etching process, which results in a plurality of pillars 510 separated by a plurality of channels 512. In some examples, the pillars 510 can have a height between 10 s or micron to 750 microns, or 50 microns to 500 microns, or 200 microns to 300 microns, or 240 microns. In step 3, a sealing structure 516 is positioned over the plurality of pillars 510, the sealing structure includes a pillar side surface 514 and an outer surface 516 opposing the pillar side surface 514. In some examples, the sealing structure 516 can include a glass wafer such as, for example, a Pyrex glass wafer.

In step 4, an oxide layer 518 is deposited over the back surface 506 of the substrate 502. In some examples, the oxide layer 518 can be deposited using plasma enhanced chemical vapor deposition (PEVCD) process. Step 5 shows the deposition of a patterned photoresist layer 520 over the oxide layer 518. The photoresist layer 520 is patterned in part to position the inlet and the outlet of the MEMS preconcentrator 400. Step 6 shows the result of etching the oxide layer 518 and removing the patterned photoresist layer 520. Step 7 shows the photolithography of the at least one heater and the at least one temperature sensor over the back surface 506 of the substrate 502. In particular, step 7 shows the result of the deposition of a sacrificial layer 522. Step 8 shows the result of the deposition of a metal layer 524. In some examples, the metal layer can include metals such as titanium and platinum. In some examples, the metal layer can be deposited using evaporation techniques. Step 9 shows the result of the patterning of the metal layer over the at least one heater and the at least one temperature sensor. In some examples, the metal layer can be patterned using the lift-off technique, i.e., the lift-off of the sacrificial layer 522, to leave behind the patterned metal 524. Step 10 shows the result of the deposition of a patterned photoresist layer 526 for use in photolithography to form through holes and the base of the inlet and the outlet, which are formed at least through the front surface 504 and the back surface 506 of the substrate 502. Step 11 shows the result of an intermediate stage of DRIE for the formation of through holes 528 and inlet and outlet ports 530. Step 12 depicts the result of the DRIE resulting in the etching of the substrate layer 502 at least through the front surface 504 and the back surface 506. Step 13 shows the result of the etching process continuing through the sealing structure 516 to form the through holes 528. In addition, step 13 shows the removal of the patterned photoresist layer 526. Step 14 shows the result of the coating of the pillars 510 with an adsorbent material 532. The adsorbent material can include materials such as, for example, Tenax TA dissolved in dichloromethane, but other adsorbent materials could also be utilized.

It should be noted that the longitudinal axes of the at least one inlet 404 and the at least one outlet 406 are substantially normal to the front surface 504 of the substrate 502. The longitudinal axes can be between about 90 degrees±10 degrees with respect to the front surface 504. Having the at least one inlet 404 and the at least one outlet 406 in this particular configuration allows the MEMS preconcentrator 400 to fit more compactly within the preconcentrator cartridge 302. In contrast, conventional preconcentrators include inlets and outlets that are coupled on the sides of the preconcentrator, i.e., substantially parallel to the front or back surface of the substrate. Because of the sideways orientation of the inlet and outlet, the preconcentrator had a relatively larger footprint, which in turn resulted in a larger cartridge.

Figure 6:
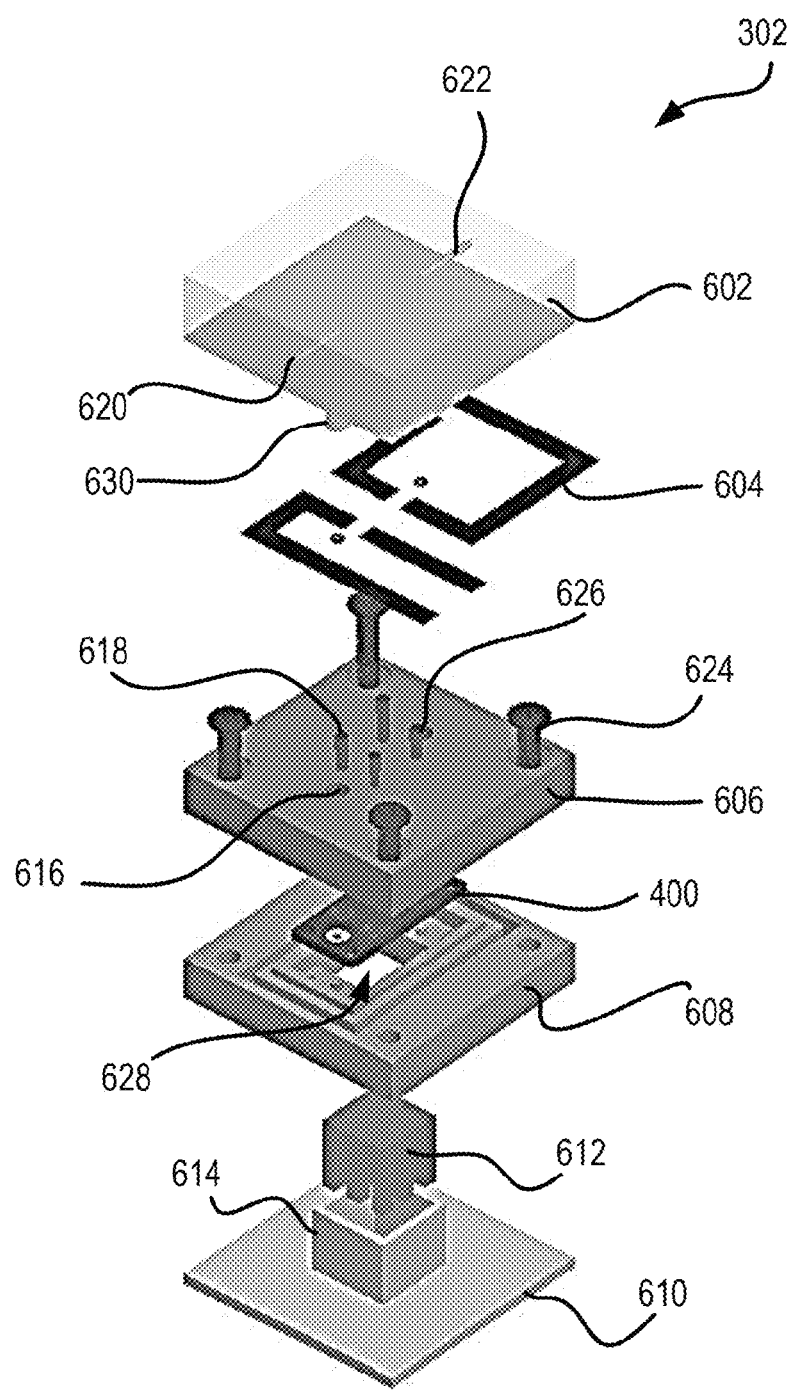
FIG. 6 shows an exploded view of an example preconcentrator cartridge.

FIG. 6 shows an exploded view of an example preconcentrator cartridge 302. The preconcentrator cartridge 302 can house the MEMS preconcentrator 400. The preconcentrator cartridge 302 includes a top cover 602, a plurality of interconnects 604, a first preconcentrator cover 606, a second preconcentrator cover 608, and a base 610. The top cover 602 can include a cartridge inlet 620 and a cartridge outlet 622. The cartridge inlet 620, when the preconcentrator cartridge 302 is assembled, is in fluid communication with the at least one inlet of the MEMS preconcentrator 400, and the cartridge outlet 622, when the preconcentrator cartridge 302 is assembled, is in fluid communication the at least one outlet of the MEMS preconcentrator 400. A portion 630 of the cartridge inlet 620 and the cartridge outlet 622 extends into the inlet conduit 616 and the outlet conduit 626 of the first preconcentrator cover 606 when assembled. The first preconcentrator cover 606 is positioned between the top cover 602 and the MEMS preconcentrator 400 and includes a first set of interconnects 618 that form a solderless electrical contact with interconnects 410 that can form terminals of the at least one heating element and the at least one temperature sensor. The first preconcentrator cover 606 also includes an inlet conduit 616 that interfaces between the cartridge inlet 620 of the top cover 602 and the at least one inlet 404 of the MEMS preconcentrator 400. Similarly, the first preconcentrator cover 606 includes an outlet conduit 626 that interfaces between the cartridge outlet 622 and the at least one outlet 406 of the MEMS preconcentrator 400. The second preconcentrator cover 608 is positioned on the other side of the MEMS preconcentrator 400 on which the first preconcentrator cover 606 is positioned. The 606 can include a cavity 628 to allow heat transfer between a heat sink 612 and the MEMS preconcentrator 400. A set of fasteners 624 can secure the MEMS preconcentrator 400 between the first preconcentrator cover 606 and the second preconcentrator cover 608. The second preconcentrator cover 608 is positioned between the MEMS preconcentrator 400 and the base 610, which includes a heat sink housing 614 to accommodate the heat sink 612.

Figure 7A:
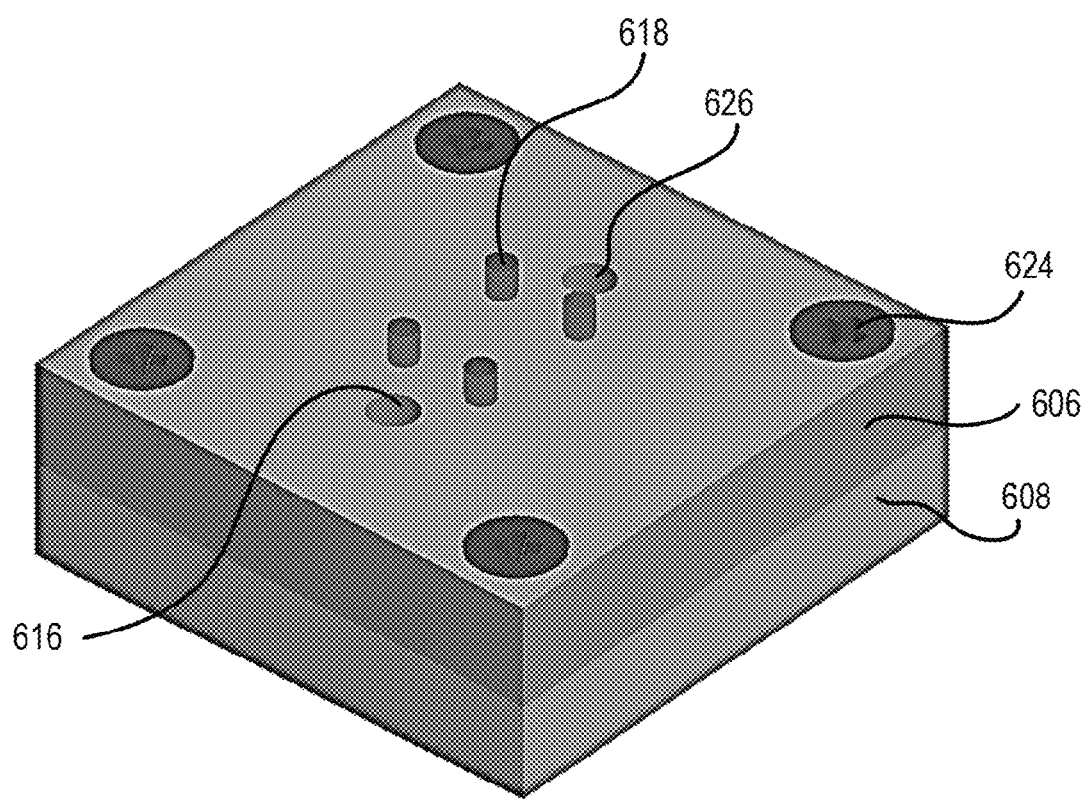
FIG. 7A shows an assembled view of a portion of the preconcentrator cartridge shown in FIG. 6.
Figure 7B:
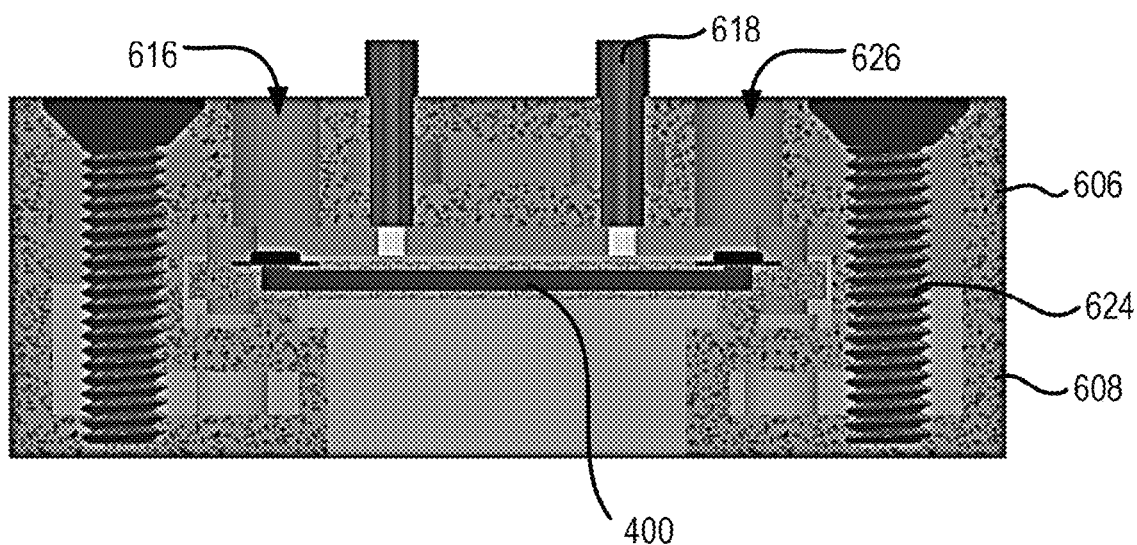
FIG. 7B shows a cross-sectional view of the preconcentrator cartridge shown in FIG. 7A.

FIG. 7A shows an assembled view of a portion of the preconcentrator cartridge 302 shown in FIG. 6. FIG. 7B shows a cross-sectional view of the preconcentrator cartridge 302 shown in FIG. 7A. The fasteners 624 can position the first preconcentrator cover 606 against the second preconcentrator cover 608 with the MEMS preconcentrator 400 therebetween (not shown in this view). In this position, the outlet conduit 626 aligns with the at least one outlet 406 and the inlet conduit 616 aligns with the at least one inlet 404 of the MEMS preconcentrator 400. Further, the interconnects 618 align with the interconnects 410 on the MEMS preconcentrator 400. The interconnects 618, for example, can be spring loaded contact leads, that allow for solderless electrical contact with the interconnects 410.

Figure 8:
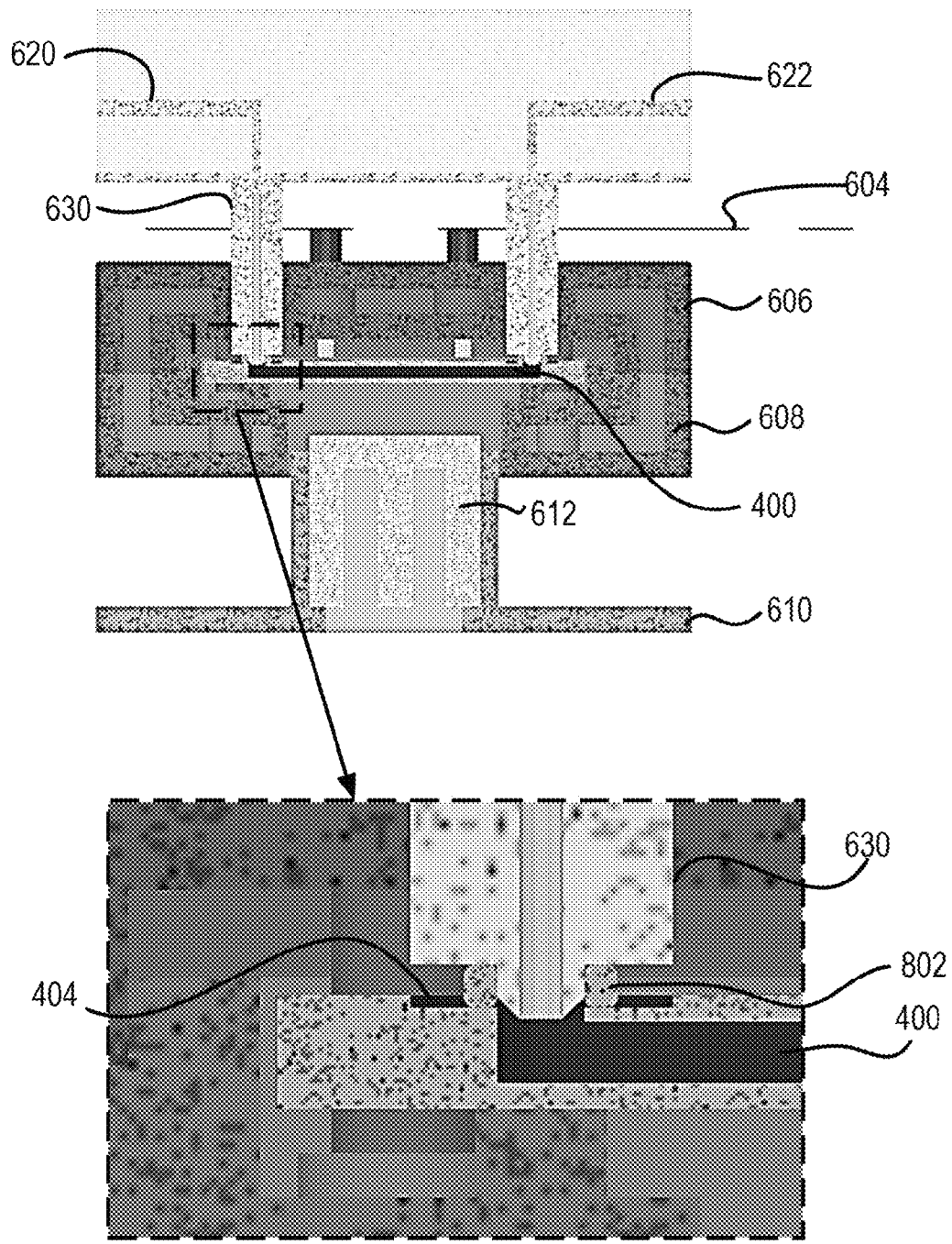
FIG. 8 shows a cross-sectional view of the preconcentrator cartridge shown in FIG. 6, with a magnified view of the interface between the portion of the cartridge inlet and the MEMS preconcentrator.

FIG. 8 shows a cross-sectional view of the preconcentrator cartridge 302 shown in FIG. 6, with a magnified view of the interface between the portion 630 of the cartridge inlet 620 and the MEMS preconcentrator 400. Compressible washers 802 can be positioned between the portion 630 of the cartridge inlet 620 and the at least one inlet 404 of the MEMS preconcentrator 400 as well as between the portion 630 of the cartridge outlet 622 and the at least one outlet 406. The compressible washers 802 can provide a leak-proof seal between the cartridge inlet 620 and the at least one inlet 404 and between the cartridge outlet 622 and the at least one outlet 406. When positioned within the receptacle 106 (FIG. 3D) of the breath sampler 102, and when the receptacle 106 is in a closed position, the cartridge inlet 620 can be in fluid communication with the inlet conduit of the breath sampler 102 and the cartridge outlet 622 is in fluid communication with the outlet conduit of the breath sampler 102. Further, a second set of interconnects on the breath sampler 102 can make electrical contact with the interconnects 604.

Figure 9:
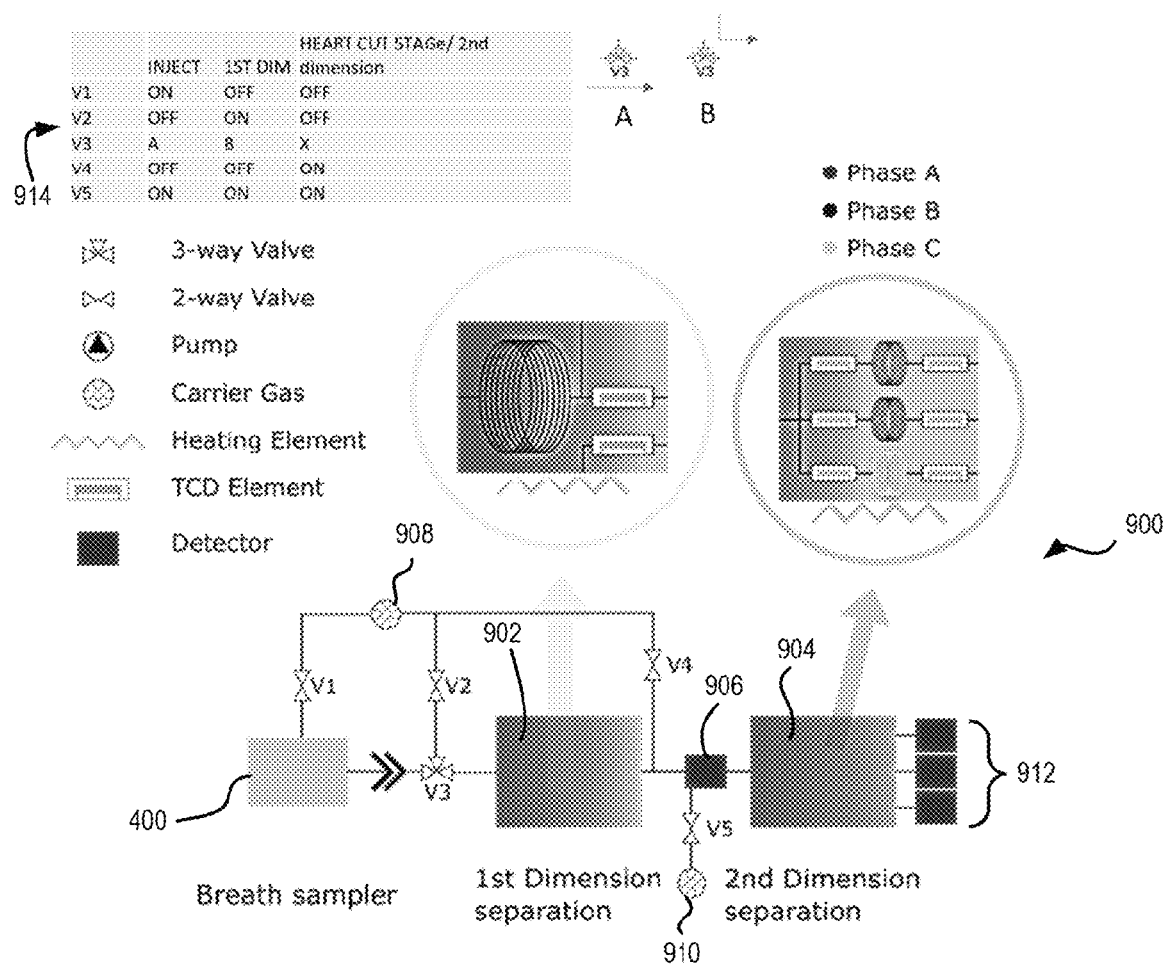
FIG. 9 shows a functional block diagram of a breath analyzer.

FIG. 9 shows a functional block diagram of a breath analyzer 900. The breath analyzer 900 can, for example, be representative of the breath analyzer 104 show in FIG. 1A. In particular, the breath analyzer 900 includes a first micro-separation column 902 coated with a first column stationary phase, and a plurality of parallel second micro-separation columns 904 in fluid communication with the first micro-separation column 902. The first micro-separation column 902 is positioned downstream of the MEMS preconcentrator 400, and the parallel second micro-separation columns 904 is positioned downstream of the first micro-separation column 902. A first valve V1 is positioned between the MEMS preconcentrator 400 and a first carrier gas source 908. A second valve V2 is positioned between the first carrier gas source 908 and a third valve V3, which is positioned between the MEMS preconcentrator 400 and the first micro-separation column 902. A fourth valve V4 is positioned between the first carrier gas source 908 and an outlet of the first micro-separation column 902. A first detector 906 is positioned at the outlet of the first micro-separation column 902. Further, fifth valve V5 is positioned between a second gas source 910 and a conduit coupling the outlet of the first micro-separation column 902 with an inlet of the parallel second micro-separation columns 904. One or more second detectors 912 are positioned at the outlet of each of the parallel second micro-separation columns 904. In the example show in FIG. 9, the parallel second micro-separation columns 904 includes three parallel micro-separation columns 904, each functionalized with a different stationary phase. The breath analyzer 900 also includes heating elements associated with each of the first micro-separation column 902 and the parallel second micro-separation columns 904. The breath analyzer 900 further include thermal conductivity detectors (TCDs) in the first micro-separation column 902 as well as in each of the parallel second micro-separation columns 904. The TCDs can generate chromatographic patterns that are representative of the VOCs detected by the respective separation column.

A state table 914 shows the states of each of the valves for an Inject mode, where the analyte in the MEMS preconcentrator 400 is injected into the first micro-separation column 902. The state table 914 also shows the states of the valves for a "$1^{st}$ DIM" operation, which follows the Injection mode, and allows the carrier gas source to provide the carrier gas to the inlet of the first micro-separation column 902. The state table 914 also shows the states of the valves for the "$2^{nd}$ dimension" operation, which follows the "$1^{st}$ DIM" operation and allows the analyte that is output from the outlet of the 902 to flow into each of the parallel second micro-separation columns 904 with the second carrier gas provided by the second gas source 910.

During operation, the analyte trapped in the MEMS preconcentrator 400 is desorbed from the MEMS preconcentrator 400 and injected into the first micro-separation column 902. Segments of separation which are of interest are then pushed into the parallel second micro-separation columns 904 by heart cutting for further separation. The parallel second micro-separation columns 904 can include multiple integrated shorter columns with integrated detectors 912. As mentioned above, each of the parallel second micro-separation columns 904 can be coated with different stationary phases with varying degrees of polarity, which allow inspection of specific regions interest that may indicate biomarkers specific to diseases of interest.

Figure 10:
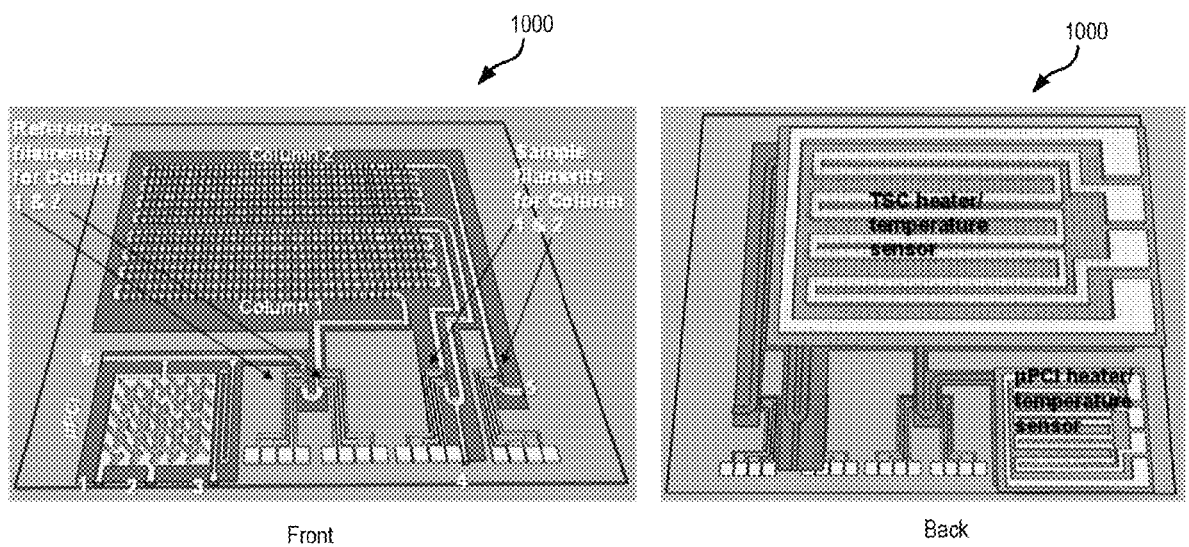
FIG. 10 shows example integrated micro-separation columns 1000 that can be utilized for implementing the micro-separation columns discussed in relation to FIG. 9.

FIG. 10 shows example integrated micro-separation columns 1000 that can be utilized for implementing the micro-separation columns discussed in relation to FIG. 9. In particular, FIG. 10 shows a front and a back side of the integrated micro-separation columns 1000. The integrated micro-separation columns 1000 can include a "Column 1" and a "Column 2". However, in some examples, more than two columns can be integrated onto the same chip. The integrated micro-separation columns 1000 can include a micro-preconcentrator "µPCI" which may be bypassed in instances where the MEMS preconcentrator 400 is utilized.

Figure 11:
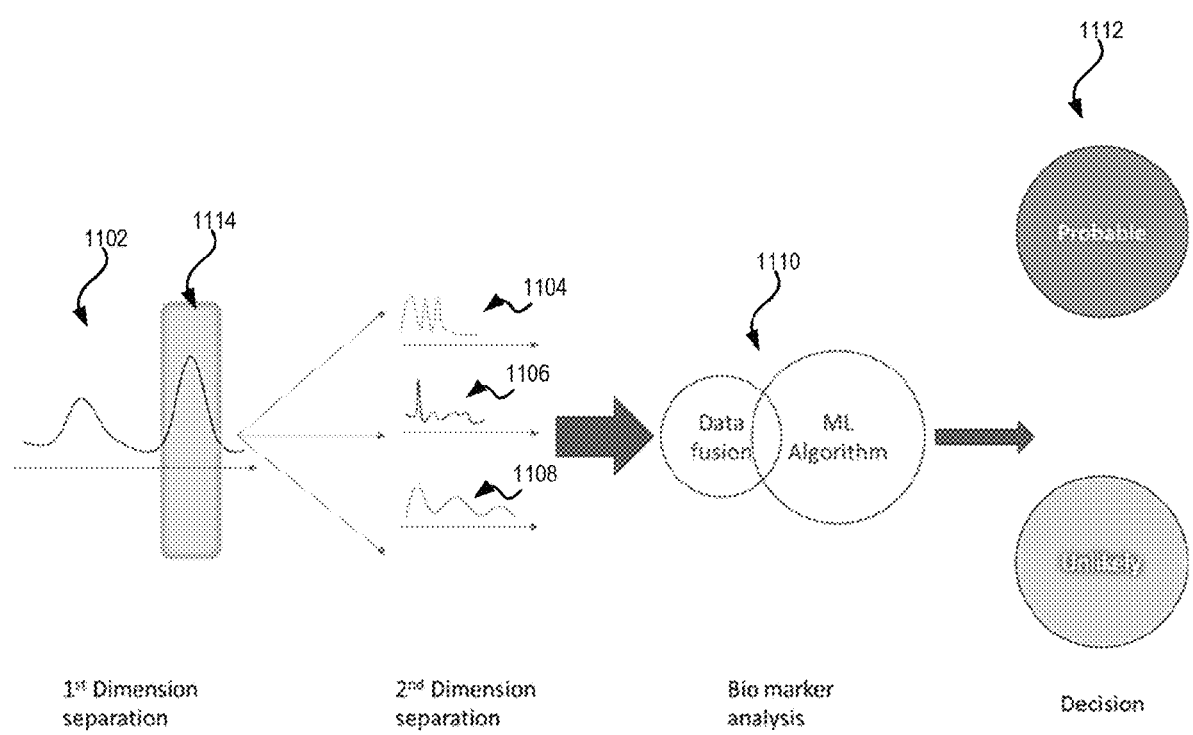
FIG. 11 depicts a data analysis phase of the data obtained by the breath analyzer.

FIG. 11 depicts a data analysis phase of the data obtained by the breath analyzer 900. During analysis, the chromatographic output 1102 of the first micro-separation column 902 is obtained. A segment 1114 of interest of the chromatographic output 1102 is fed to the parallel second micro-separation columns 904. The three parallel columns generate three separate second dimensional chromatographic outputs: a first second dimensional chromatographic output 1104, a second second dimensional chromatographic output 1106, and a third second dimensional chromatographic output 1108. These chromatographic outputs can be analyzed to detect the presence of VOCs that may correspond to diseases of interest. In some instances, the chromatographic outputs can be analyzed by the biomarker analyzer 1110 to generate a signature or fingerprint that is representative of the VOCs in the breath of the subject. That signature can be compared to signatures of other subjects to detect diseases in the subject. In some instances, the signature of the subject at one instant in time can be compared to one or more signatures of the subject at previous instances to detect changes in disease profiles. In some examples, the biomarker analyzer 1110 can utilize machine learning algorithms to analyze the VOC data associated with the subject. Examples of machine learning algorithms is provided in Table 1 of M. Esteki, Z. Shahsavari & J. Simal-Gandara (2019): "Gas Chromatographic Fingerprinting Coupled to Chemometrics for Food Authentication," Food Reviews International, (https://doi.org/10.1080/87559129.2019.1649691), which incorporated by reference herein in its entirety.

Figure 12:
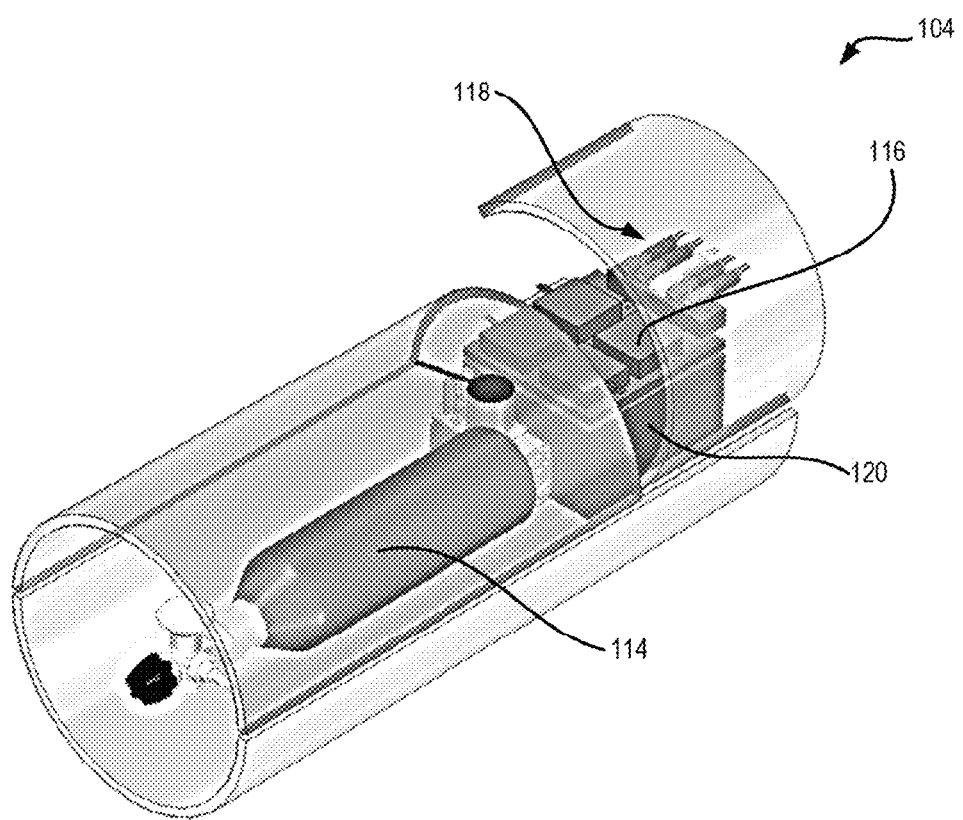
FIG. 12 shows an example breath analyzer.

FIG. 12 shows an example breath analyzer 104. The breath analyzer 104 shown in FIG. 12 can be similar to the breath analyzer 104 discussed above in relation to FIGS. 1A-1B. The analyzer processing module 120 can include an analysis module receptacle that can receive one or more microcolumns 116, which can represent the first micro-separation column 902 and the parallel second micro-separation columns 904 discussed above in relation to FIG. 9. In addition, the preconcentrator cartridge 302 also can be coupled with the analyzer processing module 120. The analyzer processing module 120 can include circuitry as well as fluidic conduits, valves 118, heaters, pumps, TCD elements, and detectors for processing the analyte of the subject to generate related data. For example, the analyzer processing module 120 can include a first column conduit for fluidly coupling the inlet of the first column with the cartridge outlet of the preconcentrator cartridge 302 when the preconcentrator cartridge 302 is mated with the analysis module receptacle. Further, the analyzer processing module 120 can include a third set of interconnects that make electrical contact with the first set of interconnects of the preconcentrator cartridge 302 that are coupled with the at least one heating element and at least one temperature sensor on the MEMS preconcentrator 400. The breath analyzer 104 may also include one or more communication modules that can communicate the data to a computer for further processing, such as for data analysis. The communication module As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Figure 13A:
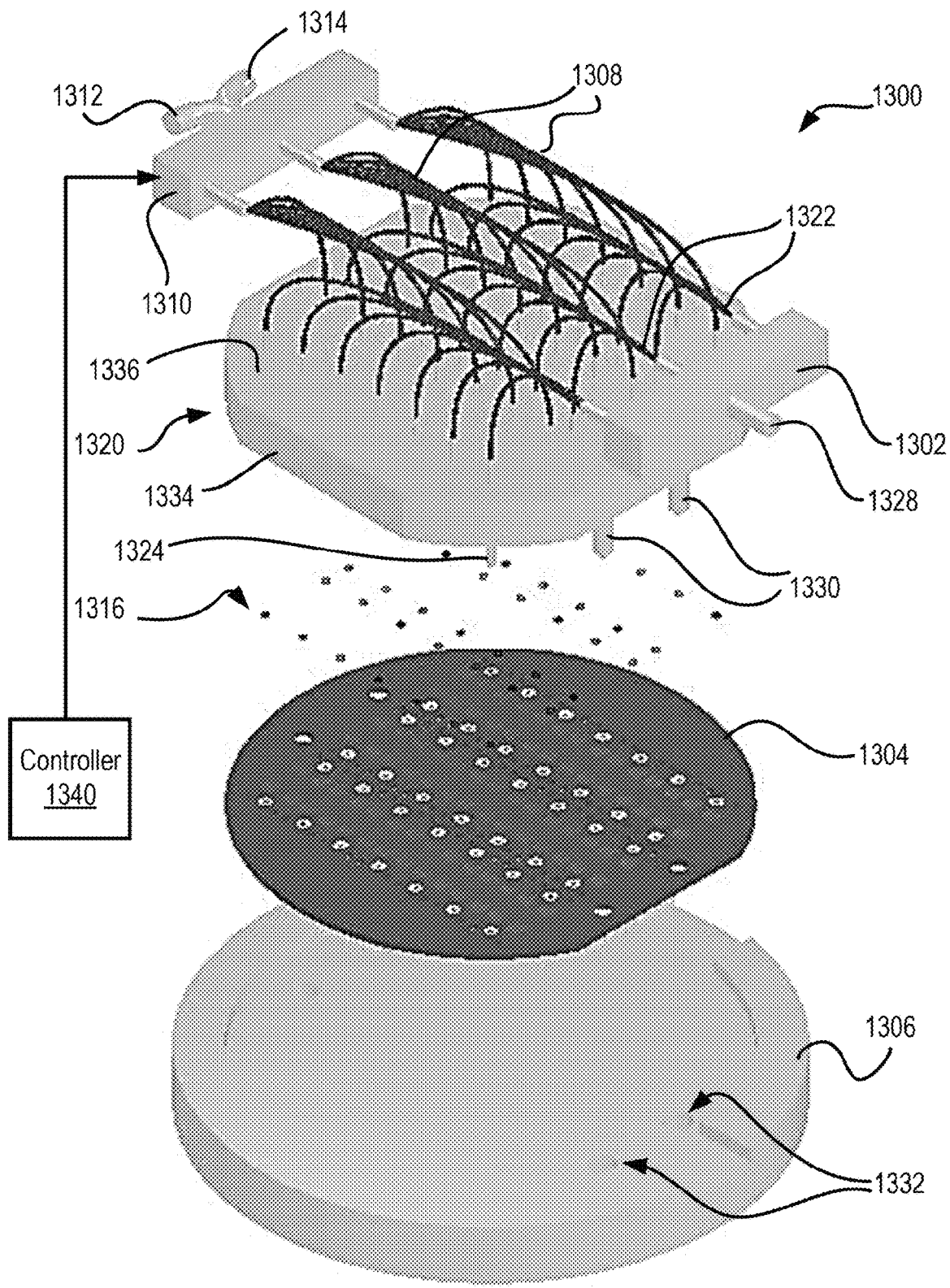
FIG. 13A shows an example preconcentrator functionalization apparatus.
Figure 13B:
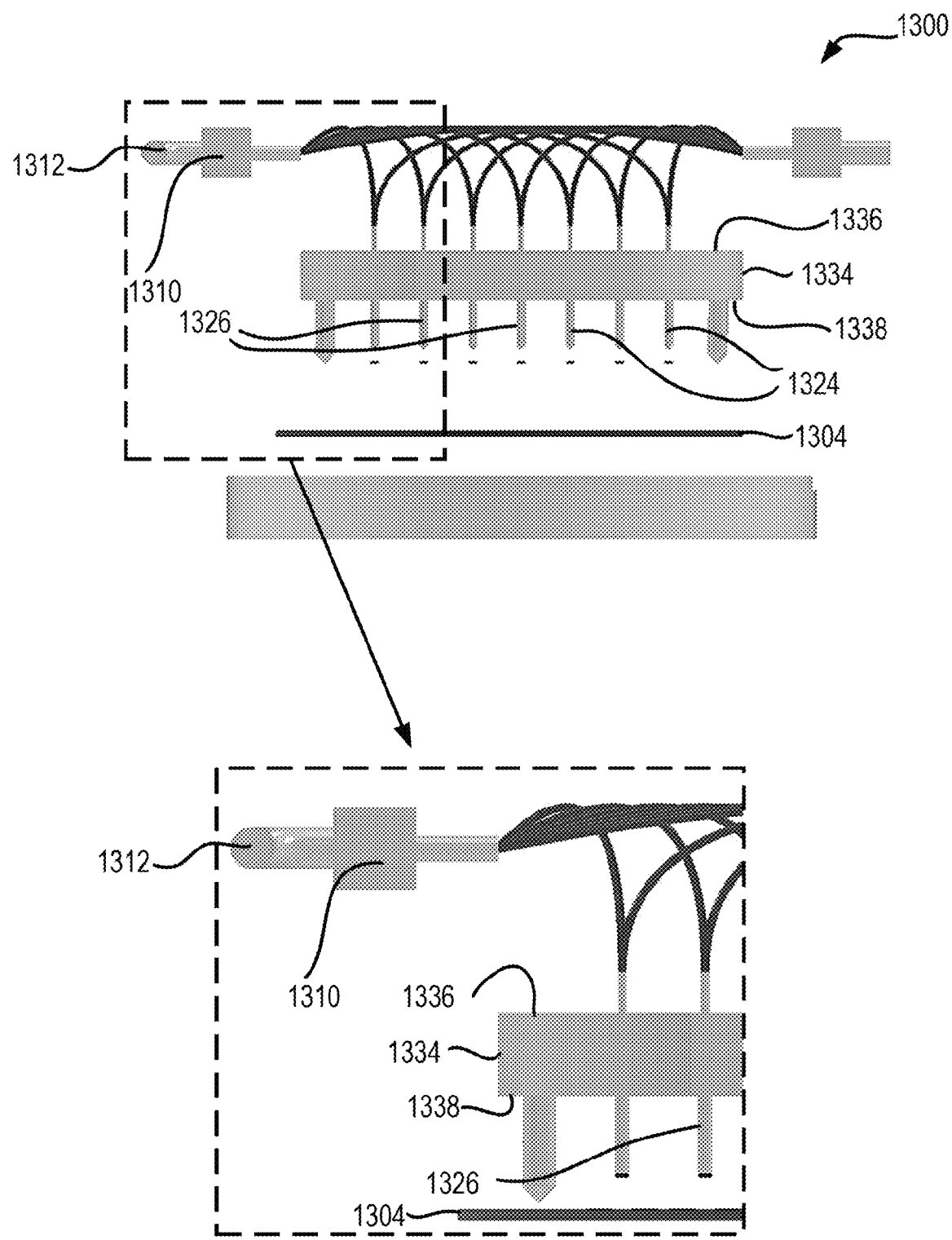
FIG. 13B shows a side view of the preconcentrator functionalization apparatus shown in FIG. 13A.
Figure 13C:
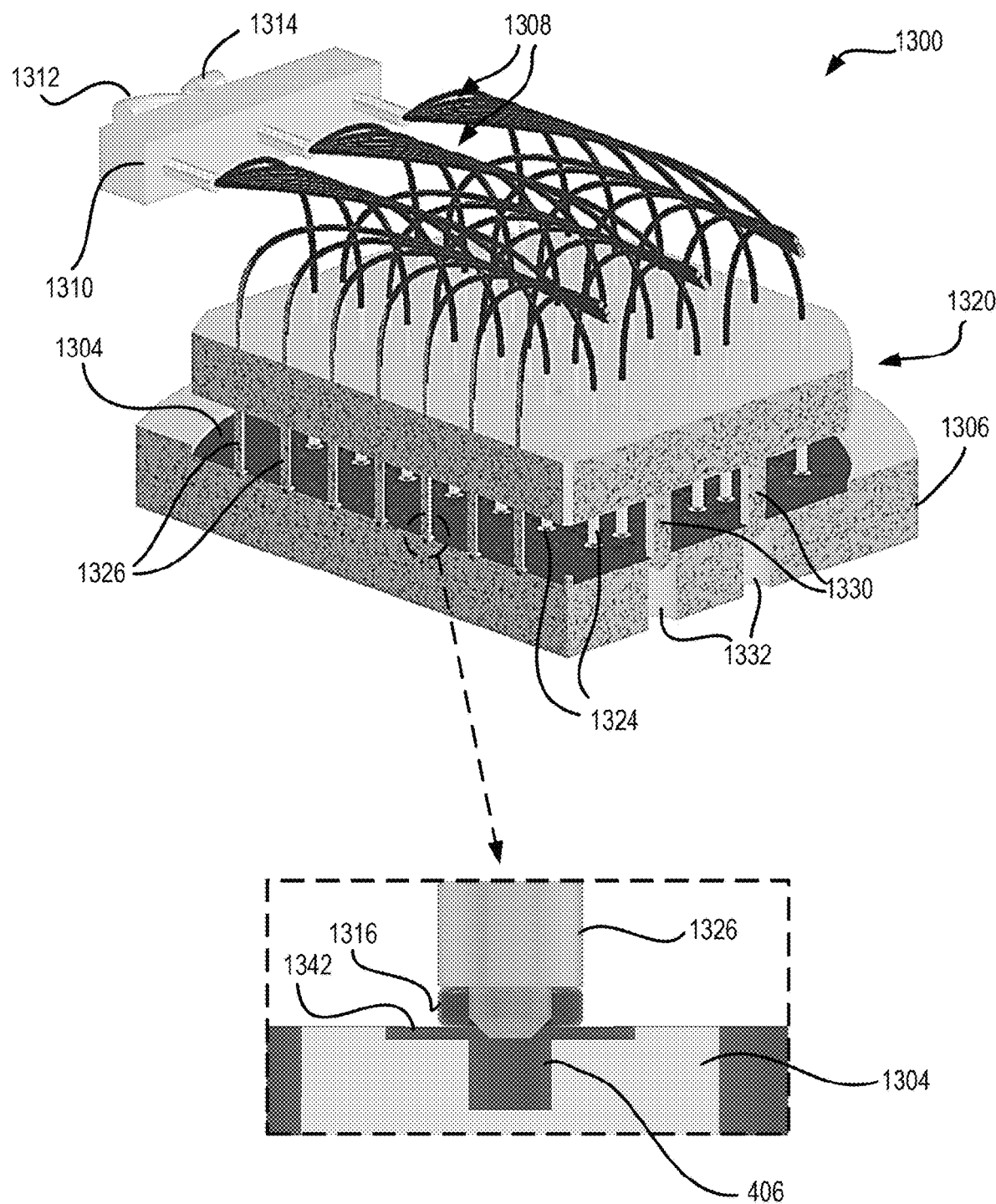
FIG. 13C shows a three-dimensional cross-sectional view of the preconcentrator functionalization apparatus shown in FIG. 13A.

FIG. 13A shows an example preconcentrator functionalization apparatus 1300. In particular, FIG. 13A shows a preconcentrator functionalization apparatus 1300 that can be utilized to functionalize wafers including pre-diced preconcentrators such as the MEMS preconcentrator 400 discussed above in relation to FIG. 4. FIG. 13B shows a side view of the preconcentrator functionalization apparatus 1300 shown in FIG. 13A. FIG. 13C shows a three-dimensional cross-sectional view of the preconcentrator functionalization apparatus 1300 shown in FIG. 13A. Traditional functionalization techniques operate on an individual device level and involve time consuming and resource intensive processes to coat the devices with stationary phase followed by purging of individual devices. Because these processes are labor intensive, time consuming, and costly, commercialization of such processes has been a challenge. The wafer level preconcentrator functionalization apparatus 1300 discussed herein facilitates efficient coating and purging of devices at the wafer level. The preconcentrator functionalization apparatus 1300 includes a wafer holder base 1306 configured to receive a wafer 1304 including a plurality of MEMS preconcentrator chips, such as the MEMS preconcentrator 400 discussed above in relation to FIG. 4. The MEMS preconcentrator 400 include at least one top facing inlet and at least on top facing outlet the examples of which include the at least one inlet 404 and the at least one outlet 406.

The preconcentrator functionalization apparatus 1300 further includes a fluid distribution module 1320 that can direct fluid into the wafer 1304 and direct fluid out of the wafer 1304. The fluid distribution module 1320 includes a purge gas inlet 1314 that is coupled with a purge gas source. The fluid distribution module 1320 also includes a stationary phase inlet 1312, which is coupled with a stationary phase source. The fluid distribution module 1320 further includes a plurality of inlet ports 1324 configured to couple with the at least one top facing inlet such as, for example, the at least one inlet 404 of the MEMS preconcentrator 400. The fluid distribution module 1320 also includes a fluid multiplexer 1310 that is configured to selectively couple the inlet ports 1324 with one of the purge gas inlet 1314 or the stationary phase inlet 1312. The fluid distribution module 1320 also includes a plurality of outlet ports 1326 configured to couple with the at least one top facing outlets such as, for example, at least one outlet 406 of the MEMS preconcentrator 400. The fluid distribution module 1320 further includes fluid outlet 1302 that fluidly couples with the outlet ports 1326. The fluid outlet 1302 collects the fluids provided by the outlet ports 1326 and directs the fluid to an outlet port 1328.

The fluid distribution module 1320 also includes at least one fluid distribution module alignment structure 1330, and the wafer holder base 1306 includes a corresponding at least one base alignment structure 1332. The at least one fluid distribution module alignment structure 1330 when aligned with the corresponding at least one base alignment structure 1332 aligns the inlet ports 1324 with the at least one top facing inlets and aligns the outlet ports 1326 with the at least one top facing outlets of the plurality of MEMS preconcentrator chips on the wafer 1304.

The fluid distribution module 1320 further includes a base structure 1334 having a top surface 1336 and a bottom surface 1338, where the inlet ports 1324 and the outlet ports 1326 extend from the bottom surface 1338. The fluid distribution module 1320 also includes a plurality of conduits that extend at least between the top surface 1336 and the bottom surface 1338. A plurality of inlet tubes 1308 fluidly couple the fluid multiplexer 1310 with the plurality of conduits that are in fluid communication with the inlet ports 1324. Further a plurality of outlet tubes 1322 fluidly couple the fluid outlet 1302 with the plurality of conduits that are in fluid communication with the outlet ports 1326. In some examples, the preconcentrator functionalization apparatus 1300 may be devoid of external tubes such as the inlet tubes 1308 and the outlet tubes 1322. Instead, the base structure 1334 can include internal channels that fluidly couple the fluid multiplexer 1310 to the inlet ports 1324 and outlet ports 1326.

The preconcentrator functionalization apparatus 1300 additionally includes a plurality of washers 1316 that are positioned at the interfaces between the plurality of inlet ports 1324 and the top facing at least one inlet 404 and at the interfaces 1342 between the plurality of outlet ports 1326 and the top facing at least one outlet 406 of the MEMS preconcentrators 400 on the wafer 1304. The plurality of washers reduce the risk of leakage at the interfaces. The washers can be compressible and can be made of compressible materials such as plastic, rubber, etc.

During operation, a controller 1340 can control the state of the fluid multiplexer 1310 to fluidly couple the stationary phase inlet 1312 to the inlet ports 1324. The controller 1340 can couple one or more stationary phase sources to the stationary phase inlet 1312. The selected stationary phase can then be directed to the at least one inlet 404 of each of the plurality of MEMS preconcentrators on the wafer 1304 simultaneously. The controller 1340 can control the fluid multiplexer 1310 and the stationary phase source to coat the MEMS preconcentrators with multiple stationary phases. After the devices have been coated with the desired stationary phases, the controller 1340 can control the fluid multiplexer 1310 to decouple the inlet ports 1324 from the stationary phase inlet 1312 and couple the inlet ports 1324 instead with the purge gas inlet 1314. The controller 1340 can then initiate the supply of the purge gases to enable purging of any excess stationary phase within the MEMS preconcentrators. The coating of the MEMS devices and the purging of the excess stationary phases is carried out at a wafer level and simultaneously for the plurality of MEMS preconcentrators on the wafer 1304. The simultaneous process improves the speed with which the MEMS preconcentrators can be functionalized. The ability to carry out simultaneous functionalization is enabled by the structure of the MEMS preconcentrators, which, as shown in FIG. 4, include top facing at least one inlet 404 and at least one outlet 406. The top facing inlets and outlets allow the simultaneous coupling of the plurality of inlet ports 1324 with the inlets and the outlet ports 1326 with the outlets of the MEMS preconcentrators on the wafer 1304. This simultaneous coupling would be difficult in MEMS preconcentrators where the inlet and outlet are side-facing instead of top facing as the functionalization would have to be carried out after dicing the individual MEMS preconcentrators from the wafer. In contrast, in the approach discussed herein, the functionalization of the MEMS preconcentrators is carried out before the individual MEMS preconcentrators are diced from the wafer 1304.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

When a range is expressed, a further aspect includes from the one particular value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list. As used in the specification and the appended claims, the singular forms "a," "an" and "the" include plural referents unless the context clearly dictates otherwise.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only and is not intended to be limiting. The skilled artisan will recognize many variants and adaptations of the aspects described herein. These variants and adaptations are intended to be included in the teachings of this disclosure and to be encompassed by the claims herein.

What is claimed is:

1. A portable apparatus for analyzing volatile organic compounds (VOCs) in breath of a subject, comprising:
    a microelectromechanical (MEMS) preconcentrator, comprising:
        a top surface and a bottom surface, the top surface defining at least one inlet and at least one outlet,
        a plurality of channels in fluid communication with the at least one inlet and the at least one outlet, the plurality of channels lined with a stationary phase,
        at least one heating element,
        at least one temperature sensor,
        a substrate having a front surface and a back surface, wherein the back surface of the substrate corresponds to the top surface of the MEMS preconcentrator,
        a plurality of pillars that extend outwardly from the front surface of the substrate, the plurality of pillars defining the plurality of channels, and
        a sealing structure positioned over the plurality of pillars, the sealing structure having a pillar side surface and an outer surface, the outer surface corresponding to the bottom surface of the MEMS preconcentrator, wherein the at least one inlet and the at least one outlet extend at least between the front surface and the back surface of the substrate, and wherein longitudinal axes of the at least one inlet and the at least one outlet are substantially normal to the front surface of the substrate;
    a preconcentrator cartridge, comprising:
        a cartridge inlet and a cartridge outlet, the cartridge inlet in fluid communication with the at least one inlet and the cartridge outlet in fluid communication with the at least one outlet,
        a heat sink positioned proximate the bottom surface of the MEMS preconcentrator, and
        a first set of interconnects that are electrically coupled with the at least one heating element and the at least one temperature sensor;
    a receptacle for removably housing the preconcentrator cartridge;
    an inlet conduit in fluid communication with the cartridge inlet when the preconcentrator cartridge is in an inserted position within the receptacle;
    an outlet conduit in fluid communication with the cartridge outlet when the preconcentrator cartridge is in an inserted position within the receptacle;
    a second set of interconnects making electrical contact with the first set of interconnects when the preconcentrator cartridge is in an inserted position within the receptacle; and
    a mouthpiece selectively in fluid communication with the cartridge inlet.

2. The portable apparatus of claim 1, wherein the at least one heating element and the at least one temperature sensor are disposed over the back surface of the substrate.

3. The portable apparatus of claim 2, wherein the first set of interconnects form a solderless contact with terminals of the at least one heating element and the at least one temperature sensor.

4. The portable apparatus of claim 1, wherein the plurality of pillars is coated with an adsorbent.

5. The portable apparatus of claim 1, further comprising:
    compressible washers positioned between the cartridge inlet and the at least one inlet and positioned between the cartridge outlet and the at least one outlet, the compressible washers providing a leak-proof seal between the cartridge inlet and the at least one inlet and between the cartridge outlet and the at least one outlet.

6. The portable apparatus of claim 1, further comprising:
    a four-way valve, including a first channel in fluid communication with the cartridge inlet, a second channel in fluid communication with a vent, a third channel in fluid communication with a sample collector syringe, and a fourth channel in fluid communication with the mouthpiece, and the four-way valve configured to, during a first duration, couple the mouthpiece with the sample collector syringe, and during a second duration, decouple the mouthpiece from the sample collector syringe and couple the sample collector syringe with the cartridge inlet.

7. The portable apparatus of claim 6, further comprising:
    a flow meter positioned downstream of the mouthpiece and upstream of the four-way valve, the flow meter configured to provide an indicator of a flow detection over a threshold value.

8. The portable apparatus of claim 6, further comprising:
    a high frequency carbon-dioxide sensor downstream of the mouthpiece and upstream of the four-way valve, wherein the first duration corresponds to the high frequency carbon-dioxide sensor measuring a value above a threshold value.

9. The portable apparatus of claim 6, further comprising:
    an analysis module, comprising:
        a first micro-separation column coated with a first column stationary phase, the first micro-separation column including a first column inlet and a first column outlet, and
        a plurality of parallel second micro-separation columns, each including a second column inlet in fluid communication with the first column outlet and a second column outlet, wherein the first micro-separation column and the plurality of parallel second micro-separation columns are configured to receive an analyte desorbed from the MEMS preconcentrator.

10. The portable apparatus of claim 9, the analysis module further comprising:
    an analysis module receptacle configured to removably accept the preconcentrator cartridge, a first column conduit for fluidly coupling the first column inlet to the cartridge outlet when the preconcentrator cartridge is mated with the analysis module receptacle, and a third set of interconnects making electrical contact with the first set of interconnects when the preconcentrator cartridge is mated with the analysis module receptacle.

11. The portable apparatus of claim 10, the analysis module further comprising:
a controller configured to:
initiate the heating element on the preconcentrator cartridge via the third set of interconnects,
initiate flow of a carrier gas through the preconcentrator cartridge,
cause the carrier gas and the analyte at the cartridge outlet to flow into the first micro-separation column and the plurality of parallel second micro-separation columns,
receive data from a first column detector at the first column outlet, and
receive data from each of a plurality of parallel second column detectors corresponding to the plurality of parallel second micro-separation columns.

12. The portable apparatus of claim 11, further comprising a processor communicably coupled with the first column detector and the plurality of parallel second column detectors, the processor configured to:
process retention times included in the data from the first column detector and the data from each of the plurality of parallel second column detectors to identify one or more VOC biomarkers.

13. The portable apparatus of claim 12, wherein the processor is configured to:
process the retention times using a machine learning model trained to provide an identity of a VOC based on a set of retention times.

14. The portable apparatus of claim 9, wherein the analysis module is physically coupled with a sampler module including at least the MEMS preconcentrator.

* * * * *